United States Patent
Luo et al.

(10) Patent No.: US 10,548,182 B2
(45) Date of Patent: Jan. 28, 2020

(54) BEAM MANAGEMENT FOR CONNECTED DISCONTINUOUS RECEPTION WITH ADVANCED GRANT INDICATOR

(71) Applicant: QUALCOMM Incorporated, San Diego, CA (US)

(72) Inventors: Jianghong Luo, Skillman, NJ (US); Muhammad Nazmul Islam, Edison, NJ (US); Sumeeth Nagaraja, San Diego, CA (US); Ashwin Sampath, Skillman, NJ (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/104,656

(22) Filed: Aug. 17, 2018

(65) Prior Publication Data

US 2019/0059129 A1 Feb. 21, 2019

Related U.S. Application Data

(60) Provisional application No. 62/548,142, filed on Aug. 21, 2017.

(51) Int. Cl.
*G08C 17/00* (2006.01)
*H04W 76/28* (2018.01)
(Continued)

(52) U.S. Cl.
CPC ....... *H04W 76/28* (2018.02); *H04W 52/0229* (2013.01); *H04W 56/001* (2013.01);
(Continued)

(58) Field of Classification Search
CPC . H04W 76/28; H04W 52/0216; H04W 16/28; H04W 72/046; H04W 72/14;
(Continued)

(56) References Cited

U.S. PATENT DOCUMENTS

| 2014/0198696 A1* | 7/2014 | Li | H04W 52/0229 370/311 |
| 2015/0078189 A1* | 3/2015 | Kwon | H04W 52/0216 370/252 |

(Continued)

FOREIGN PATENT DOCUMENTS

| WO | WO2017204726 A1 | 11/2017 |
| WO | WO2018031327 A1 | 2/2018 |

OTHER PUBLICATIONS

Qualcomm, "Wakeup Signaling for multi-beam systems", R2-1709116, Aug. 20, 2017 (Year: 2017).*

(Continued)

*Primary Examiner* — Mang Hang Yeung
(74) *Attorney, Agent, or Firm* — Holland & Hart LLP

(57) ABSTRACT

Methods, systems, and devices for wireless communication are described. A base station may transmit, to a user equipment (UE) operating in a discontinuous reception mode, a wakeup signal indicating whether data is available to be transmitted to the UE, the wakeup signal transmitted using a first set of transmit beams, which may be selected from a periodic beam management procedure, in accordance with a beam sweeping configuration. The base station may receive, from the UE and based at least in part on the wakeup signal, a response signal. The base station may perform, based at least in part on the response signal, further beam update procedures to identify a second set of transmit beams for future transmissions of the wakeup signal and/or for transmission of physical downlink control channel (PDCCH) to the UE.

30 Claims, 21 Drawing Sheets

(51) Int. Cl.
*H04W 72/04* (2009.01)
*H04W 72/14* (2009.01)
*H04W 56/00* (2009.01)
*H04W 52/02* (2009.01)

(52) U.S. Cl.
CPC ....... *H04W 72/042* (2013.01); *H04W 72/046* (2013.01); *H04W 72/14* (2013.01)

(58) Field of Classification Search
CPC ........... H04W 52/0229; H04W 56/001; H04W 72/042; H04B 7/0619; H04B 7/088; H04B 7/0695; H04B 7/063
USPC ......................................................... 370/311
See application file for complete search history.

(56) References Cited

U.S. PATENT DOCUMENTS

| | | | | |
|---|---|---|---|---|
| 2016/0192433 | A1* | 6/2016 | Deenoo | H04W 72/046 370/329 |
| 2017/0251518 | A1* | 8/2017 | Agiwal | H04W 24/08 |
| 2017/0325057 | A1* | 11/2017 | Zhang | H04W 4/02 |
| 2018/0132292 | A1* | 5/2018 | Yang | H04W 76/18 |

OTHER PUBLICATIONS

Qualcomm, "Wake-up Signaling for C-DRX", R2-1709155, Aug. 20, 2017 (Year: 2017).*
Huawei, "Consideration on beam management with C-DRX", R2-1704863, May 14, 2017 (Year: 2017).*
Huawei et al., "Consideration on Beam Management with C-DRX", 3GPP Draft; R21704863 Beam Management with DRX, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017, XP051275378, Retrieved from the Internet: URL:http://www.3gpp.org/ftp/Meetings_3GPP_SYNC/RAN2/Docs/ [retrieved on May 14, 2017], 4 pages.
Intel Corporation: "C-DRX enhancement in NR", 3GPP Draft; R2-1704785 C-DRX, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017 May 14, 2017, XP051275305, Retrieved from the Internet: URL:http://www.3gpp.org/ftp/Meetings_3GPP_SYNC/RAN2/Docs/ [retrieved on May 14, 2017], 6 pages.
International Search Report and Written Opinion—PCT/US2018/047087—ISA/EPO—dated Dec. 19, 2018 (175949WO).
QUALCOMM Incorporated: "Beam Management and C-DRX Operation", 3GPP Draft; R2-1706911 Beam Management and DRX, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 29, 2017 Jun. 26, 2017, XP051301408, Retrieved from the Internet: URL:http://www.3gpp.org/ftp/Meetings_3GPP_SYNC/RAN2/ [retrieved on Jun. 26, 2017], 3 pages.
QUALCOMM Incorporated: "Wake-Up Signaling for C-DRX", 3GPP Draft; R2-1709115 Wake-Up Signaling for C-DRX, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017, XP051318908, Retrieved from the Internet: URL:http://www.3gpp.org/ftp/Meetings_3GPP_SYNC/RAN2/Docs/ [retrieved on Aug. 20, 2017], 5 pages.
QUALCOMM: "Wakeup Signaling for Multi-Beam Systems", 3GPP DRAFT; R2-1709116 Wakeup Signaling for Multi-Beam Systems, 3rd Generation Partnership Project (3GPP), Mobile Competence Centre; 650 Route Des Lucioles; F-06921 Sophia-Antipolis Cedex; France, vol. RAN WG2. No. Berlin, Germany; Aug. 21, 2017-Aug. 25, 2017 Aug. 20, 2017, XP051318909, Retrieved from the Internet: URL:http://www.3gpp.org/ftp/Meetings_3GPP_SYNC/RAN2/Docs/ [retrieved on Aug. 20, 2017], 4 pages.
Interdigital Communications: "C-DRX Beam Management Aspects", 3GPP Draft; R2-1701187 (NR SI Al10214) C-DRX Beam Management Aspects, 3rd Generation Partnership Project (3GPP), Mobile Competence Centre; 650, Route Des Lucioles; F-06921 Sophia-Antipolis Cedex; France, vol. RAN WG2, no. Athens, Greece; Feb. 13, 2017-Feb. 17, 2017, Feb. 17, 2017 (Feb. 12, 2017), pp. 1-3, XP051211879, Retrieved from the Internet: URL: http://www.3gpp.org/ftp/Meetings_3GPP_SYNC/RAN2/Docs/ [retrieved on Feb. 12, 2017].

* cited by examiner

BEAM MANAGEMENT FOR CONNECTED DISCONTINUOUS RECEPTION WITH ADVANCED GRANT INDICATOR

CROSS REFERENCES

The present Application for Patent claims the benefit of U.S. Provisional Patent Application No. 62/548,142 by Luo et al., entitled "BEAM MANAGEMENT FOR CONNECTED DISCONTINUOUS RECEPTION WITH ADVANCED GRANT INDICATOR," filed Aug. 21, 2017, assigned to the assignee hereof, and expressly incorporated by reference herein.

BACKGROUND

The following relates generally to wireless communication, and more specifically to beam management for connected discontinuous reception (C-DRX) with an advanced grant indicator (AGI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a C-DRX mode) where the UE transitions between an active state (e.g., where the UE wakes up during an On Duration to determine if data is available for the UE) and a sleep state (e.g., where the UE shuts down various hardware/processes to conserve power). Conventionally, the UE may determine if data is available by monitoring a control channel, such as a physical downlink control channel (PDCCH). The PDCCH may carry or otherwise convey an indication that the base station has data ready to transmit to the UE. In a mmW wireless communication system, the mmW base station (e.g., a next generation nodeB (gNB)) may need to beam sweep the PDCCH transmissions to mitigate high path losses associated with mmW transmissions. This may result in the UE attempting to decode the PDCCH multiple times and/or wake up for a longer time period to receive and decode the PDCCH transmissions and/or allow for beam management. Power consumption at the UE using such techniques may be high.

SUMMARY

The described techniques relate to improved methods, systems, devices, or apparatuses that support beam management for connected discontinuous reception (C-DRX) with advanced grant indicator (AGI). Generally, the described techniques provide for the transmission of a wakeup signal to a user equipment (UE) in a sleep state of a discontinuous reception (DRX) mode (e.g., a C-DRX mode). The wakeup signal may carry or otherwise convey an indication of whether the base station has data to transmit the UE. For example, a base station may transmit the wakeup signal in a beam swept pattern using a set of transmit beams. The UE may receive the wakeup signal and determine whether data is available to be transmitted to the UE. The UE may transmit a response signal based on the wakeup signal that acknowledges receipt of the indication that data is available to be transmitted to the UE (if applicable) and include beam status information indicating whether one or more of the transmit beams in the set of transmit beams are performing well or below a performance threshold. The base station and UE may perform a beam update procedure based on the response signal to identify a new set of transmit beams to use for transmitting subsequent instances of the wakeup signal. In some aspects, the beam management for a regular physical downlink control channel (PDCCH) signal may also be performed after an AGI indicating traffic is acknowledged by the UE. In some aspects, a separate periodic beam management procedure may be performed for selection of the transmit beams to use for the AGI.

In some aspects, the response signal may include the acknowledgement of the indication that traffic is available to transmit the UE and the status of the transmit beams in the set of transmit beams, but the beam update procedure may not be warranted. For example, if one or both of the transmit beams in the set of transmit beams are performing at or above the performance threshold, the beam update procedure may not be performed. Thus, in some instances the response signal may carry or otherwise convey an indication that the UE has received the indication that data is available for the UE.

A method of wireless communication is described. The method may include transmitting, to a UE operating in a DRX mode, a wakeup signal indicating whether data is available to be transmitted to the UE, the wakeup signal transmitted using a first set of transmit beams in accordance with a beam sweeping configuration, receiving, from the UE and based at least in part on the wakeup signal, a response signal, and performing, based at least in part on the response signal, a beam update procedure to identify a second set of transmit beams for future transmissions of the wakeup signal to the UE.

An apparatus for wireless communication is described. The apparatus may include means for transmitting, to a UE operating in a DRX mode, a wakeup signal indicating whether data is available to be transmitted to the UE, the wakeup signal transmitted using a first set of transmit beams in accordance with a beam sweeping configuration, means for receiving, from the UE and based at least in part on the wakeup signal, a response signal, and means for performing, based at least in part on the response signal, a beam update procedure to identify a second set of transmit beams for future transmissions of the wakeup signal to the UE.

Another apparatus for wireless communication is described. The apparatus may include a processor, memory in electronic communication with the processor, and instructions stored in the memory. The instructions may be operable to cause the processor to transmit, to a UE operating in a DRX mode, a wakeup signal indicating whether data is available to be transmitted to the UE, the wakeup signal transmitted using a first set of transmit beams in accordance with a beam sweeping configuration, receive, from the UE and based at least in part on the wakeup signal, a response signal, and perform, based at least in part on the response signal, a beam update procedure to identify a second set of transmit beams for future transmissions of the wakeup signal to the UE.

A non-transitory computer readable medium for wireless communication is described. The non-transitory computer-readable medium may include instructions operable to cause a processor to transmit, to a UE operating in a DRX mode, a wakeup signal indicating whether data is available to be transmitted to the UE, the wakeup signal transmitted using a first set of transmit beams in accordance with a beam sweeping configuration, receive, from the UE and based at least in part on the wakeup signal, a response signal, and perform, based at least in part on the response signal, a beam update procedure to identify a second set of transmit beams for future transmissions of the wakeup signal to the UE.

Some examples of the method, apparatus, and non-transitory computer-readable medium described above may further include processes, features, means, or instructions for configuring the wakeup signal to indicate that data may be available to be transmitted to the UE. Some examples of the method, apparatus, and non-transitory computer-readable medium described above may further include processes, features, means, or instructions for receiving, based at least in part on the wakeup signal, the response signal indicating that the UE may have received the indication that data may be available to be transmitted to the UE.

In some examples of the method, apparatus, and non-transitory computer-readable medium described above, the response signal comprises a beam status report.

In some examples of the method, apparatus, and non-transitory computer-readable medium described above, the beam status report may be received from the UE in response to every transmission of the wakeup signal.

In some examples of the method, apparatus, and non-transitory computer-readable medium described above, the beam status report may be received from the UE in response to the at least one transmit beam in the first set of transmit beams being below the performance threshold.

Some examples of the method, apparatus, and non-transitory computer-readable medium described above may further include processes, features, means, or instructions for transmitting a trigger message to the UE, wherein the beam update procedure may be based at least in part on the trigger message.

Some examples of the method, apparatus, and non-transitory computer-readable medium described above may further include processes, features, means, or instructions for identifying that data may be available to transmit to the UE. Some examples of the method, apparatus, and non-transitory computer-readable medium described above may further include processes, features, means, or instructions for configuring the wakeup signal to indicate that the data may be available to be transmitted to the UE, wherein transmitting the wakeup signal may be in response to the data being available.

Some examples of the method, apparatus, and non-transitory computer-readable medium described above may further include processes, features, means, or instructions for scheduling the beam update procedure based at least in part on the response signal, the beam update procedure comprising an aperiodic channel state information reference signal (CSI-RS) transmission.

Some examples of the method, apparatus, and non-transitory computer-readable medium described above may further include processes, features, means, or instructions for performing an additional beam update procedure according to a periodic schedule, based at least in part on an integer number of DRX cycles.

In some examples of the method, apparatus, and non-transitory computer-readable medium described above, the additional beam update procedure may be performed in advance of transmission of the wakeup signal within a DRX cycle.

In some examples of the method, apparatus, and non-transitory computer-readable medium described above, the additional beam update procedure comprises transmission of a periodic CSI-RS, a periodic synchronization signal, or combinations thereof.

Some examples of the method, apparatus, and non-transitory computer-readable medium described above may further include processes, features, means, or instructions for identifying a communication metric associated with communications with the UE, with other UEs, or combinations thereof. Some examples of the method, apparatus, and non-transitory computer-readable medium described above may further include processes, features, means, or instructions for selecting a value for the integer number of DRX cycles based at least in part on the communication metric.

In some examples of the method, apparatus, and non-transitory computer-readable medium described above, the communication metric comprises a beam coherence time, a traffic arrival statistic, or combinations thereof.

Some examples of the method, apparatus, and non-transitory computer-readable medium described above may further include processes, features, means, or instructions for performing, based at least on receiving the response signal, a beam management procedure to identify a third set of transmit beams for a PDCCH signal, the PDCCH signal indicating a grant of resources used to transmit the data to the UE. Some examples of the method, apparatus, and non-transitory computer-readable medium described above may further include processes, features, means, or instructions for transmitting the data to the UE using the indicated resources.

Some examples of the method, apparatus, and non-transitory computer-readable medium described above may further include processes, features, means, or instructions for receiving, based at least in part on the PDCCH signal, an additional response signal indicating at least one transmit beam from the third set of transmit beams. Some examples of the method, apparatus, and non-transitory computer-readable medium described above may further include processes, features, means, or instructions for selecting, based at least in part on the indication, the at least one transmit beam to transmit the data to the UE.

In some examples of the method, apparatus, and non-transitory computer-readable medium described above, the third set of transmit beams comprises a subset of the first or second sets of transmit beams.

In some examples of the method, apparatus, and non-transitory computer-readable medium described above, the third set of transmit beams comprises a beam width narrower than a beam width of the first or second sets of transmit beams.

In some examples of the method, apparatus, and non-transitory computer-readable medium described above, the transmit beams in the first and second sets of transmit beams comprise pseudo-omni transmit beams.

In some examples of the method, apparatus, and non-transitory computer-readable medium described above, the wakeup signal comprises a narrowband tone, or a UE-specific reference signal, or a PDCCH including a bit that indicates that the UE may be to wake up from a sleep state, or a combination thereof.

Some examples of the method, apparatus, and non-transitory computer-readable medium described above may further include processes, features, means, or instructions for configuring the wakeup signal to include a bit that may be transmitted when there may be data available to be transmitted to the UE. Some examples of the method, apparatus, and non-transitory computer-readable medium described above may further include processes, features, means, or instructions for configuring the wakeup signal to refrain from transmitting the bit when there may be no data available to be transmitted to the UE.

A method of wireless communication is described. The method may include receiving, from a base station and while operating in a DRX mode, a wakeup signal indicating whether data is available to be transmitted to the UE, the wakeup signal transmitted using a first set of transmit beams in accordance with a beam sweeping configuration, determining, based at least in part on the wakeup signal, that there is data available to be transmitted to the UE, transmitting, based at least in part on the determining, a response signal, and performing, based at least in part on the response signal, a beam update procedure to identify a second set of transmit beams for future transmissions of the wakeup signal to the UE.

An apparatus for wireless communication is described. The apparatus may include means for receiving, from a base station and while operating in a DRX mode, a wakeup signal indicating whether data is available to be transmitted to the UE, the wakeup signal transmitted using a first set of transmit beams in accordance with a beam sweeping configuration, means for determining, based at least in part on the wakeup signal, that there is data available to be transmitted to the UE, means for transmitting, based at least in part on the determining, a response signal, and means for performing, based at least in part on the response signal, a beam update procedure to identify a second set of transmit beams for future transmissions of the wakeup signal to the UE.

Another apparatus for wireless communication is described. The apparatus may include a processor, memory in electronic communication with the processor, and instructions stored in the memory. The instructions may be operable to cause the processor to receive, from a base station and while operating in a DRX mode, a wakeup signal indicating whether data is available to be transmitted to the UE, the wakeup signal transmitted using a first set of transmit beams in accordance with a beam sweeping configuration, determine, based at least in part on the wakeup signal, that there is data available to be transmitted to the UE, transmit, based at least in part on the determining, a response signal, and perform, based at least in part on the response signal, a beam update procedure to identify a second set of transmit beams for future transmissions of the wakeup signal to the UE.

A non-transitory computer readable medium for wireless communication is described. The non-transitory computer-readable medium may include instructions operable to cause a processor to receive, from a base station and while operating in a DRX mode, a wakeup signal indicating whether data is available to be transmitted to the UE, the wakeup signal transmitted using a first set of transmit beams in accordance with a beam sweeping configuration, determine, based at least in part on the wakeup signal, that there is data available to be transmitted to the UE, transmit, based at least in part on the determining, a response signal, and perform, based at least in part on the response signal, a beam update procedure to identify a second set of transmit beams for future transmissions of the wakeup signal to the UE.

In some examples of the method, apparatus, and non-transitory computer-readable medium described above, the response signal comprises a beam status report.

In some examples of the method, apparatus, and non-transitory computer-readable medium described above, the beam status report may be transmitted to the base station in response to every transmission of the wakeup signal.

In some examples of the method, apparatus, and non-transitory computer-readable medium described above, the beam status report may be transmitted to the base station in response to the at least one transmit beam in the first set of transmit beams being below the performance threshold.

Some examples of the method, apparatus, and non-transitory computer-readable medium described above may further include processes, features, means, or instructions for receiving, a trigger message from the base station, wherein the beam update procedure may be based at least in part on the trigger message.

Some examples of the method, apparatus, and non-transitory computer-readable medium described above may further include processes, features, means, or instructions for performing, based at least on receiving the response signal, a beam management procedure to identify a third set of transmit beams for a PDCCH signal, the PDCCH signal indicating a grant of resources used to transmit the data to the UE. Some examples of the method, apparatus, and non-transitory computer-readable medium described above may further include processes, features, means, or instructions for receiving the data from the base station using the indicated resources.

Some examples of the method, apparatus, and non-transitory computer-readable medium described above may further include processes, features, means, or instructions for transmitting, based at least in part on the PDCCH signal, an additional response signal indicating at least one transmit beam from the third set of transmit beams, wherein the data may be received from the base station based at least in part on the at least one transmit beam.

In some examples of the method, apparatus, and non-transitory computer-readable medium described above, the third set of transmit beams comprise a beam width narrower than a beam width of the first or second sets of transmit beams.

In some examples of the method, apparatus, and non-transitory computer-readable medium described above, the third set of transmit beams comprise a subset of the first or second sets of transmit beams.

In some examples of the method, apparatus, and non-transitory computer-readable medium described above, the transmit beams in the first and second sets of transmit beams comprise pseudo-omni transmit beams.

In some examples of the method, apparatus, and non-transitory computer-readable medium described above, the wakeup signal comprises a narrowband tone, or a UE-specific reference signal, or a PDCCH including a bit that indicates that the UE may be to wake up from a sleep state, or a combination thereof.

A method of wireless communication is described. The method may include transmitting, to a UE operating in a DRX mode, a wakeup signal indicating that data is available to be transmitted to the UE, the wakeup signal transmitted using a set of transmit beams in accordance with a beam sweeping configuration and receiving, from the UE and based at least in part on the wakeup signal, a response signal indicating that the UE has received the indication that data is available to be transmitted to the UE.

An apparatus for wireless communication is described. The apparatus may include means for transmitting, to a UE operating in a DRX mode, a wakeup signal indicating that data is available to be transmitted to the UE, the wakeup signal transmitted using a set of transmit beams in accordance with a beam sweeping configuration and means for receiving, from the UE and based at least in part on the wakeup signal, a response signal indicating that the UE has received the indication that data is available to be transmitted to the UE.

Another apparatus for wireless communication is described. The apparatus may include a processor, memory in electronic communication with the processor, and instructions stored in the memory. The instructions may be operable to cause the processor to transmit, to a UE operating in a DRX mode, a wakeup signal indicating that data is available to be transmitted to the UE, the wakeup signal transmitted using a set of transmit beams in accordance with a beam sweeping configuration and receive, from the UE and based at least in part on the wakeup signal, a response signal indicating that the UE has received the indication that data is available to be transmitted to the UE.

A non-transitory computer readable medium for wireless communication is described. The non-transitory computer-readable medium may include instructions operable to cause a processor to transmit, to a UE operating in a DRX mode, a wakeup signal indicating that data is available to be transmitted to the UE, the wakeup signal transmitted using a set of transmit beams in accordance with a beam sweeping configuration and receive, from the UE and based at least in part on the wakeup signal, a response signal indicating that the UE has received the indication that data is available to be transmitted to the UE.

In some examples of the method, apparatus, and non-transitory computer-readable medium described above, the response signal comprises a beam status report.

In some examples of the method, apparatus, and non-transitory computer-readable medium described above, the beam status report may be received from the UE in response to every transmission of the wakeup signal.

In some examples of the method, apparatus, and non-transitory computer-readable medium described above, the beam status report may be received from the UE when at least one transmit beam in the set of transmit beams may be below a performance threshold.

In some examples of the method, apparatus, and non-transitory computer-readable medium described above, the beam status report may be transmitted to the base station when at least one transmit beam in the set of transmit beams may be below a performance threshold.

Some examples of the method, apparatus, and non-transitory computer-readable medium described above may further include processes, features, means, or instructions for performing, based at least on receiving the response signal, a beam management procedure to identify a second set of transmit beams for a PDCCH signal, the PDCCH signal indicating a grant of resources used to transmit the data to the UE. Some examples of the method, apparatus, and non-transitory computer-readable medium described above may further include processes, features, means, or instructions for transmitting the data to the UE using the indicated resources.

Some examples of the method, apparatus, and non-transitory computer-readable medium described above may further include processes, features, means, or instructions for receiving, based at least in part on the PDCCH signal, an additional response signal indicating at least one transmit beam from the second set of transmit beams. Some examples of the method, apparatus, and non-transitory computer-readable medium described above may further include processes, features, means, or instructions for selecting, based at least in part on the indication, the at least one transmit beam to transmit the data to the UE.

Some examples of the method, apparatus, and non-transitory computer-readable medium described above may further include processes, features, means, or instructions for receiving, based at least in part on the PDCCH signal, an additional response signal indicating a request for the beam management procedure. Some examples of the method, apparatus, and non-transitory computer-readable medium described above may further include processes, features, means, or instructions for initiating the beam management procedure with the UE based at least in response to the additional response signal.

In some examples of the method, apparatus, and non-transitory computer-readable medium described above, the second set of transmit beams comprise a beam width narrower than a beam width of the set of transmit beams used to transmit the wakeup signal.

A method of wireless communication is described. The method may include receiving, from a base station and while operating in a DRX mode, a wakeup signal transmitted using a set of transmit beams in accordance with a beam sweeping configuration, determining, based at least in part on the wakeup signal, that data is available to be transmitted to the UE, and transmitting a response signal to the base station indicating that the UE has received the indication that data is available to be transmitted to the UE.

An apparatus for wireless communication is described. The apparatus may include means for receiving, from a base station and while operating in a DRX mode, a wakeup signal transmitted using a set of transmit beams in accordance with a beam sweeping configuration, means for determining, based at least in part on the wakeup signal, that data is available to be transmitted to the UE, and means for transmitting a response signal to the base station indicating that the UE has received the indication that data is available to be transmitted to the UE.

Another apparatus for wireless communication is described. The apparatus may include a processor, memory in electronic communication with the processor, and instructions stored in the memory. The instructions may be operable to cause the processor to receive, from a base station and while operating in a DRX mode, a wakeup signal transmitted using a set of transmit beams in accordance with a beam sweeping configuration, determine, based at least in part on the wakeup signal, that data is available to be transmitted to the UE, and transmit a response signal to the base station indicating that the UE has received the indication that data is available to be transmitted to the UE.

A non-transitory computer readable medium for wireless communication is described. The non-transitory computer-readable medium may include instructions operable to cause a processor to receive, from a base station and while operating in a DRX mode, a wakeup signal transmitted using a set of transmit beams in accordance with a beam sweeping configuration, determine, based at least in part on the wakeup signal, that data is available to be transmitted to the UE, and transmit a response signal to the base station indicating that the UE has received the indication that data is available to be transmitted to the UE.

In some examples of the method, apparatus, and non-transitory computer-readable medium described above, the response signal comprises a beam status report.

In some examples of the method, apparatus, and non-transitory computer-readable medium described above, the beam status report may be transmitted to the base station in response to every received wakeup signal.

Some examples of the method, apparatus, and non-transitory computer-readable medium described above may further include processes, features, means, or instructions for performing, based at least on receiving the response signal, a beam management procedure to identify a second set of transmit beams for a PDCCH signal, the PDCCH signal indicating a grant of resources used to transmit the data to the UE. Some examples of the method, apparatus, and non-transitory computer-readable medium described above may further include processes, features, means, or instructions for receiving the data from the base station using the indicated resources.

Some examples of the method, apparatus, and non-transitory computer-readable medium described above may further include processes, features, means, or instructions for transmitting, based at least in part on the PDCCH signal, an additional response signal indicating at least one transmit beam from the second set of transmit beams. Some examples of the method, apparatus, and non-transitory computer-readable medium described above may further include processes, features, means, or instructions for receiving, based at least in part on the indication, the data transmitted using the at least one transmit beam.

Some examples of the method, apparatus, and non-transitory computer-readable medium described above may further include processes, features, means, or instructions for transmitting, based at least in part on the PDCCH signal, an additional response signal indicating a request for the beam management procedure. Some examples of the method, apparatus, and non-transitory computer-readable medium described above may further include processes, features, means, or instructions for initiating the beam management procedure with the base station based at least in response to the additional response signal.

In some examples of the method, apparatus, and non-transitory computer-readable medium described above, the second set of transmit beams comprise a beam width narrower than a beam width of the set of transmit beams used to transmit the wakeup signal.

DETAILED DESCRIPTION

Figure 1:
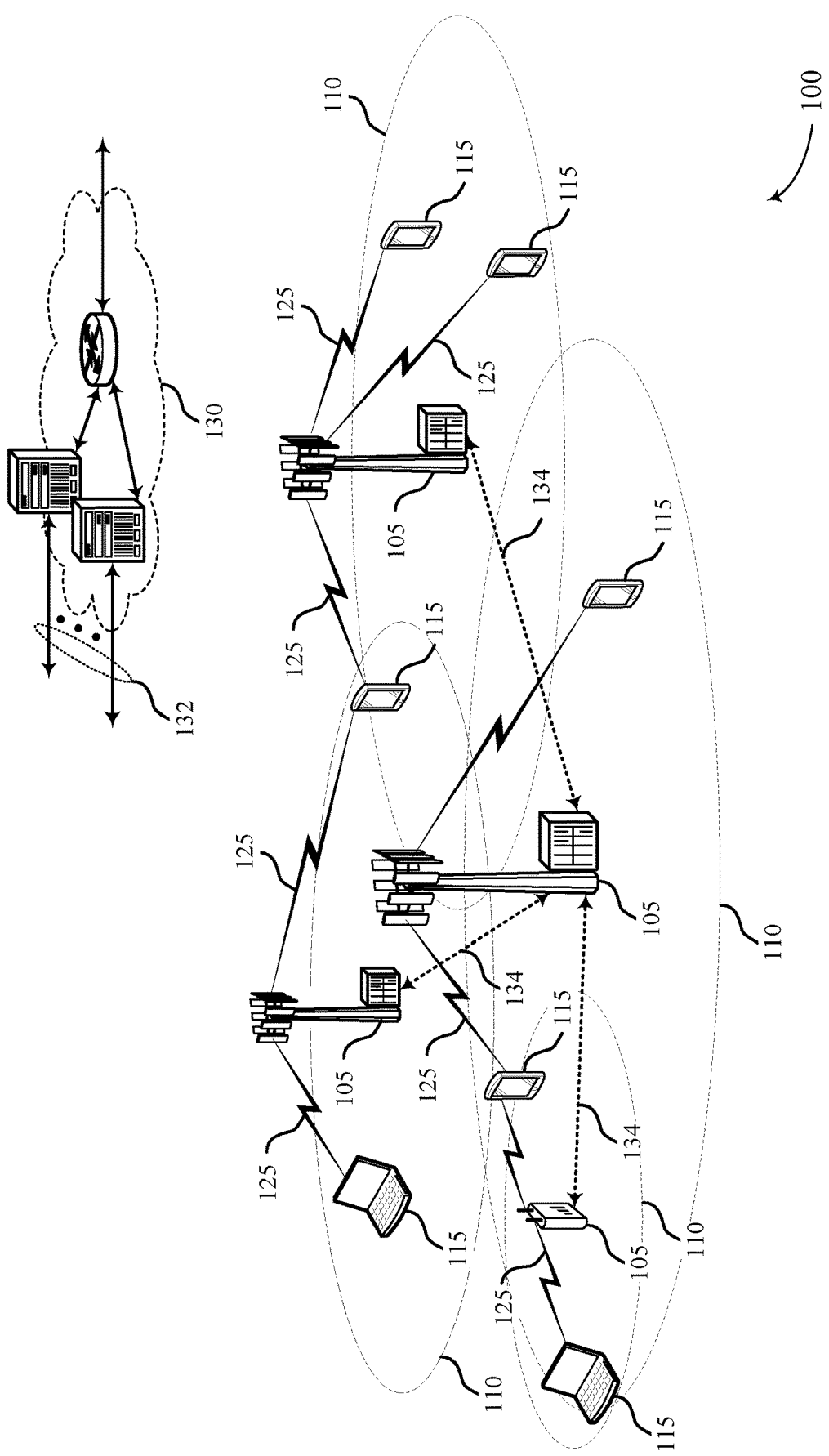
FIG. 1 illustrates an example of a system for wireless communication that supports beam management for connected discontinuous reception (C-DRX) with advanced grant indicator (AGI) in accordance with aspects of the present disclosure.

A wireless device may implement a discontinuous reception (DRX) cycle to enable the efficient use of battery power for reception of downlink transmissions. A base station and a user equipment (UE) may establish a radio resource control (RRC) connection and the UE may enter a sleep state when not actively communicating. For example, during RRC connection establishment, a DRX configuration, including a DRX-On cycle and DRX-Off cycle duration, may be configured in an RRC connection setup request or an RRC connection reconfiguration request. The DRX configuration may determine how frequently the UE is scheduled to wake-up and monitor for and receive downlink data in accordance with the configured DRX cycle durations.

Some wireless communications systems may support beamformed transmissions between the base station and the UE. For instance, a wireless communications system may operate in millimeter wave (mmW) frequency ranges (e.g., 28 GHz, 40 GHz, 60 GHz, etc.). Wireless communications at mmW frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A base station may use a number of antenna ports associated with arrays of antennas for directional receive beam configurations at the base station and one or more directional or beamformed downlink transmissions. Similarly, a UE may utilize beamforming for directional receive beams at the UE and for beamformed uplink transmission to the base station. Accordingly, both the UE and base station may use beamforming techniques for wakeup signal reception and transmission over one or more transmit beams.

Aspects of the disclosure are initially described in the context of a wireless communications system. For example, a base station may use a set of transmit beams to transmit a wakeup signal to a UE. The wakeup signal may be or otherwise convey an advanced grant indicator (AGI) for the UE. The wakeup signal may be transmitted prior to an On Duration of the DRX cycle and the AGI may provide an indication to the UE of whether or not the base station has data available to transmit to the UE, e.g., bit(s) that are transmitted when data is available and omitted when there is no data for the UE. The UE may receive the wakeup signal and respond with a response signal transmitted to the base station. The response signal may, when there is data available for the UE, acknowledge or confirm that the UE has received the indication that data is available for the UE in the wakeup signal. Accordingly, the base station may transmit a physical downlink control channel (PDCCH) signal to the UE including grant information for the resources that will be used to transmit the data to the UE.

In some aspects, the base station and UE may cooperate in a beam update procedure for the wakeup signal. For example, the base station may transmit the wakeup signal using a set of transmit beams (e.g., two, three, etc., transmit beams) that are beamformed towards the UE. The UE may receive the wakeup signal on one or both of the transmit beams in the set of transmit beams and measure one or more performance metrics associated with the transmit beams, e.g., received power level, interference level, etc. The UE may configure the response signal to also indicate, if applicable, that at least one of the transmit beams is below a performance threshold. In some aspects, this indication may be in the form of a raw measurement of the performance metric (e.g., received signal strength for one or more of the transmit beams) or may be in the form of a flag indicating that at least one of the transmit beams is below the performance threshold. The base station may receive the response signal and, based on the indication, perform a beam update procedure with the UE to find a new set of transmit beams to use for communications with the UE. The base station and UE may then use the new set of transmit beams for future wakeup signal transmissions.

Aspects of the disclosure are further illustrated by and described with reference to apparatus diagrams, system diagrams, and flowcharts that relate to beam management for connected discontinuous reception (C-DRX) with AGI.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mm W communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

PDCCH carries downlink control information (DCI) in control channel elements (CCEs), which may consist of nine logically contiguous resource element groups (REGs), where each REG contains four resource elements (REs). DCI includes information regarding downlink (DL) scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information. CCEs may be indexed, and the common search space may start from, for example, CCE 0. The starting index for a UE-specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Synchronization (e.g., cell acquisition) may be performed using synchronization signals or channels transmitted by a network entity (e.g., a base station 105). In some cases, a base station 105 may transmit synchronization signal (SS) blocks (which may be referred to as SS bursts) containing discovery reference signals. For example, SS blocks may include a primary synchronization signal (PSS), a secondary synchronization signal (SSS), a physical broadcast channel (PBCH) signal, or other synchronization signals (e.g., a tertiary synchronization signal (TSS)). In some examples, the signals included in an SS block may include a PSS, an SSS, a PBCH, and/or other synchronization signals that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two symbols of an SS block), and synchronization signals (e.g., PSS and SSS) may be transmitted in another subset of SS block time resources. Furthermore, in deployments that use mmW transmission frequencies, multiple SS blocks may be transmitted in different directions using beam sweeping in a SS burst, and SS bursts may be periodically transmitted according to a SS burst set. In cases where a base station 105 may transmit omni-directionally, a SS block may be periodically transmitted according to a configured periodicity.

For example, a base station 105 may transmit multiple instances of an SS block, on different beams, during a periodic broadcast channel transmission time interval (BCH TTI). In other cases, a base station 105 may transmit multiple instances of a SS block on a same beam, or in an omnidirectional manner, during a periodic BCH TTI. A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). In some cases, the PBCH may carry a master information block (MIB) and one or more system information blocks (SIBs) for a given cell.

Because a base station 105 may not know the locations of devices attempting to synchronize with a cell of the base station, SS blocks may be successively transmitted in a beam swept manner (e.g., across multiple symbol periods). A UE 115 may receive one or more of the SS blocks and determine a suitable downlink beam pair (e.g., based on a signal quality of the SS block being greater than a threshold). However, the beams over which the SS blocks are transmitted may be relatively coarse (e.g., broad). Accordingly, communications between the UE 115 and base station 105 may benefit from beam refinement, in which narrower uplink and downlink receive and transmit beams are selected. The width of a given beam (e.g., a narrow beam, a broad beam, etc.) may be modified by adjusting weighting of one or more of the elements in a transmitting or receiving antenna array. Such adjustments may be empirically determined by a receiving device (e.g., based on measurements of one or more reference signals). Each UE 115 attempting to access a given cell may receive a set of downlink reference signals and transmit a set of uplink reference signals to enable such beam refinement.

In some cases, a UE 115 receives an SS block may perform a cell measurement on the SS block, and may also acquire a network associated with a base station that transmitted the SS block. To determine a beam on which the SS block is transmitted, or to determine a timing of the SS block within a sequence of SS blocks (and in some cases, to fully determine the timing of the SS block or a synchronization signal therein), a UE 115 may have to decode a PBCH within the SS block and obtain an SS block index from the SS block (e.g., because the SS block index may convey a beam index associated with the SS block and/or the location of the SS block within a sequence of SS blocks).

Thus, a base station 105 may know a set of transmit beams to use for communicating with the UE 115. Accordingly, the base station 105 may transmit, to a UE 115 operating in a DRX mode, a wakeup signal indicating whether data is available to be transmitted to the UE 115. The wakeup signal may be transmitted using a first set of transmit beams in accordance with a beam sweeping configuration. The UE 115 may receive the wakeup signal and determine that there is data available to be transmitted to the UE 115. Accordingly, the UE 115 may respond by transmitting a response signal to the base station 105. The response signal may indicate that the UE 115 has received an indication from the base station 105 in the wakeup signal that data is available to be transmitted to the UE 115, if applicable, and a beam status report in some instances. The beam status report may indicate the status of the transmit beams in the first set of transmit beams. The UE 115 and base station 105 may, based on the response signal, perform a beam update procedure to identify a second set of transmit beams for future transmissions of the wakeup signal to the UE 115, if needed.

Figure 2:
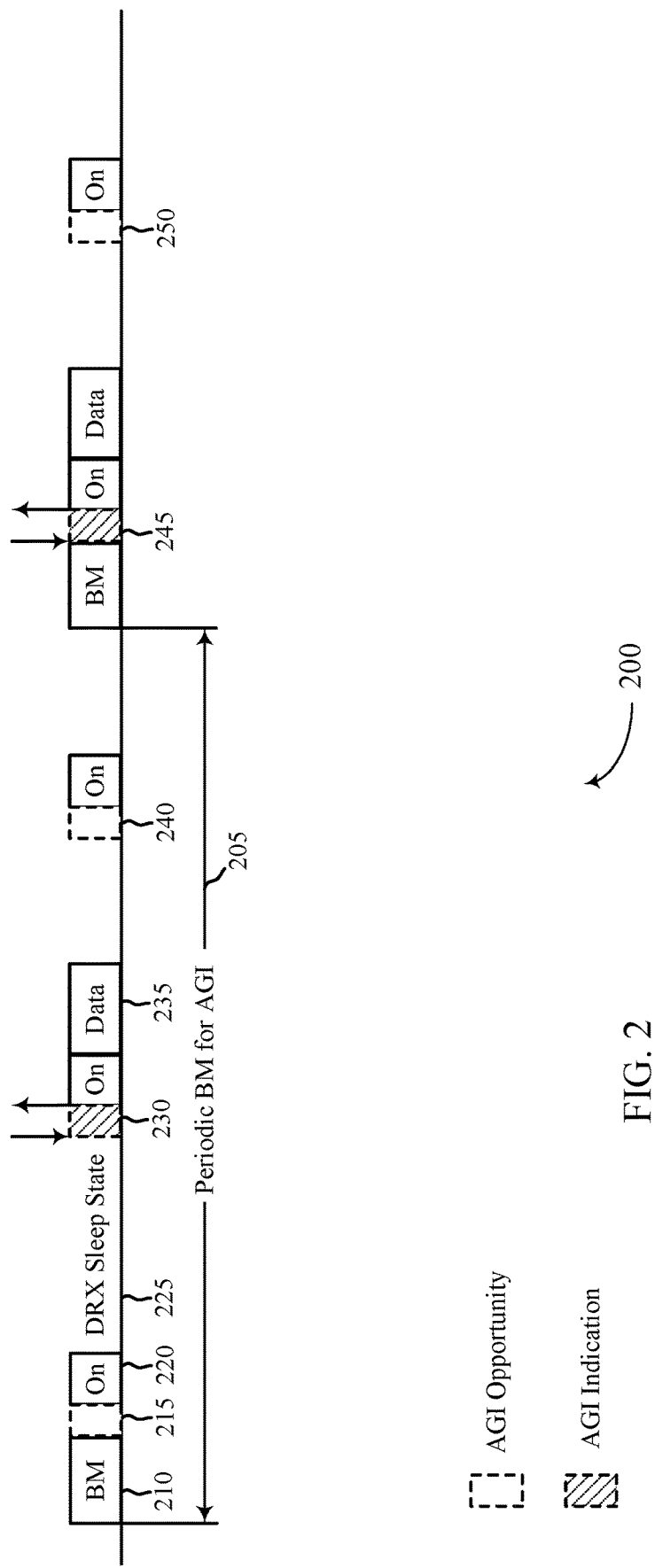
FIG. 2 illustrates an example of a wakeup configuration that supports beam management for C-DRX with AGI in accordance with aspects of the present disclosure.

FIG. 2 illustrates an example of a wakeup configuration 200 that supports beam management for C-DRX with AGI in accordance with various aspects of the present disclosure. In some examples, wakeup configuration 200 may implement aspects of wireless communication system 100. Aspects of wakeup configuration 200 may be implemented by a UE and/or a base station, which may be examples of the corresponding devices described herein. Broadly, wakeup configuration 200 illustrates one example of periodic beam management procedures for C-DRX.

Generally, an AGI may be used by a UE for power saving techniques. The AGI may carry or otherwise convey one or two bits (e.g., be a small payload) of information that indicates to the UE whether a downlink grant should be expected in the following PDCCH signal transmitted during the On Duration of the DRX cycle. The grant of downlink resources may be associated with the base station having data to transmit to the UE. The AGI techniques may be implemented as a wakeup signal while the UE is operating in a C-DRX mode, for cross-slot scheduling in PDCCH-monitoring mode, and the like. The signaling format for the AGI may vary and may, in one example, include an On-Off AGI for wakeup where the base station transmits the AGI to signal "grant expected," and transmits a discontinuous transmission (DTX) for "grant unexpected." In another example, the signaling format for the AGI may include an On-Off for AGI sleep where the base station transmits AGI to signal "grant unexpected," DTX for "grant expected." In yet another example, the signaling format for the AGI may include explicit AGI where the base station always transmits the AGI which explicitly indicates one of the above states. The AGI may be UE-specific or group-specific.

In some aspects, a wakeup signal (e.g., AGI) may be transmitted during an AGI opportunity, which may be a time offset before the UE transitions to the On Duration of the DRX cycle. The time offset may be configured by the network and, in some cases, may be a zero value, e.g., the On Duration may occur immediately after the AGI opportunity. Broadly, a C-DRX procedure using an AGI may include, at every AGI opportunity before the On Duration the UE may wake up with minimum functionality to receive and decode the AGI. If the AGI indicates that data is available for the UE or the UE has uplink traffic to transmit to the base station, the UE may transition to full functionality for the incoming On Duration to monitor the PDCCH signal from the base station. The PDCCH signal may indicate a grant of resources to be used for the data communications. Otherwise, the UE may transition back to the sleep state and skip the incoming On Duration.

In some aspects, a periodic beam update procedure may be performed for C-DRX with AGI. An opportunistic beam management procedure may include a separate procedure for the AGI (e.g., a beam update procedure) and a regular PDCCH signal (e.g., a beam management procedure). In some aspects, periodic beam updates may be used for AGI regardless of traffic status, e.g., to ensure reliable reception of AGI (or wakeup signal) transmissions. In some aspects, beam management for regular PDCCH and opportunistic beam management for AGI may only be used when there is traffic for the UE, e.g., to minimize power consumption. In some aspects, different sets of transmit beams may be used for AGI beams versus regular PDCCH beams. In some aspects, the AGI may use a signal with a lowest available code rate, e.g., a lower code rate that is used for PDCCH signals. In some aspects, a set of coarse transmit beams may be used for AGI, while a set of fine transmit beams may be used for the PDCCH signal.

In some aspects, the AGI may be transmitted over N>=1 beams. For example, to ensure robustness of AGI reception and minimize likelihood of beam failure. The value of N may be configured by the network based on a particular application scenario, channel statistics, tradeoff between power consumption and latency requirements, and the like.

In some aspects, periodic beam update for AGI may be performed using reference signals. For example, the reference signals may be periodic, e.g., CSI-RS or SS blocks. The configured period=K DRX_cycles, with K depending on factors such as beam coherence time, traffic arrival statistics, and the like. In some aspects, opportunistic beam updates for AGI may be performed when the AGI is transmitted with N>1 beams. The beam management for regular PDCCH may be performed after an AGI transmission (e.g., wakeup signal) indicating traffic.

Thus, a UE may be configured with a beam management period 205 that covers a number of DRX cycles (e.g., K DRX_cycles), e.g., the integer value K may be selected depending on the beam coherence, and the like. A DRX cycle includes the UE transitioning between an On Duration 220 and sleep state 225. In the example wakeup configuration 200, the value K is four, meaning that a periodic beam management procedure may be performed between the UE and the base station before every fourth instance of the UE transitioning to the On Duration. The beam management procedure 210 is performed according to the beam management period 205 and is explained in more detail with reference to wakeup configuration 300 of FIG. 3.

Thus, at the beginning of beam management period 205 the UE and base station may perform a beam management procedure 210. The beam management procedure 210 may be followed by an AGI opportunity where, if data is available for the UE, the base station transmits a wakeup signal. If no data is available, the base station may refrain from transmitting the wakeup signal and the UE may skip the following On Duration by transitioning to the sleep state.

Therefore, at the first AGI opportunity 215, the base station does not transmit the wakeup signal due to no data being available for the UE and accordingly the UE may transition to a sleep state during the On Duration 220, e.g., skip the On Duration. At the next AGI opportunity 230, the base station may identify that there is data available to transmit to the UE and accordingly transmit the wakeup signal carrying an AGI indication to the UE using a set of transmit beams. The UE may respond with a response signal indicating that the UE has received the AGI indication regarding data being available to transmit to the UE. The UE may transition to a fully functional mode during the following On Duration and receive the data 235 from the base station. At the next AGI opportunity 240, the base station may determine that there is no data to transmit to the UE and accordingly refrain from transmitting the wakeup signal to the UE. The UE may transition to the sleep state during the following On Duration.

Prior to the next AGI opportunity 245, the base station and UE may perform another beam management procedure according to the periodic schedule, e.g., the beam management period 205. Following the beam management procedure, the base station may determine that there is data available to transmit to the UE and transmit the wakeup signal during the AGI opportunity 245 to convey an AGI indication. The UE may respond with a response signal to the base station confirming receipt of the AGI indication. Accordingly, the UE may transition to a fully functional state during the following On Duration to receive the PDCCH signal indicating the resource grant and receive the data following the On Duration. The data may be received using the resources indicated in the resource grant of the PDCCH signal. At the next AGI opportunity 250, the base station may determine that there is no data to transmit to the UE and therefore refrain from transmitting the wakeup signal. The UE may then transition to the sleep state during the following On Duration.

As discussed, the AGI indications during the AGI opportunities 230 and 245 may be transmitted using a set of transmit beams that are beam swept to the UE. In some aspects, the transmit beams used to transmit the wakeup signal may be coarse transmit beams (e.g., pseudo-omni transmit beams) or may be fine transmit beams. In some aspects, the set of transmit beams used to transmit the wakeup signal may have a wider beam width than the beams used to transmit the PDCCH signal to the UE.

In some aspects, the wakeup signal conveying the AGI indication may include a narrowband tone, a UE-specific reference signal, a PDCCH signal, and the like. In some aspects, the base station may configure the wakeup signal to include a bit (or couple of bits) that is transmitted only when there is data available to transmit to the UE.

In some aspects, the response signal from the UE may be transmitted based on the AGI indication. For example, the UE may send the response signal to the base station to acknowledge that that the UE has received the AGI indication indicating that data is available to be transmitted to the UE. The UE may refrain from transmitting a response signal when there is no data available to be transmitted to the UE. In some aspects, the base station may not transmit the PDCCH signal during an On Duration if the response signal is not received from the UE. This may reduce the likelihood of a C-DRX state mismatch in the instance where the UE does not receive the wakeup signal carrying the AGI indication, e.g., when the set of transmit beams used to transmit the wakeup signal are no longer viable transmit beams.

Figure 3:
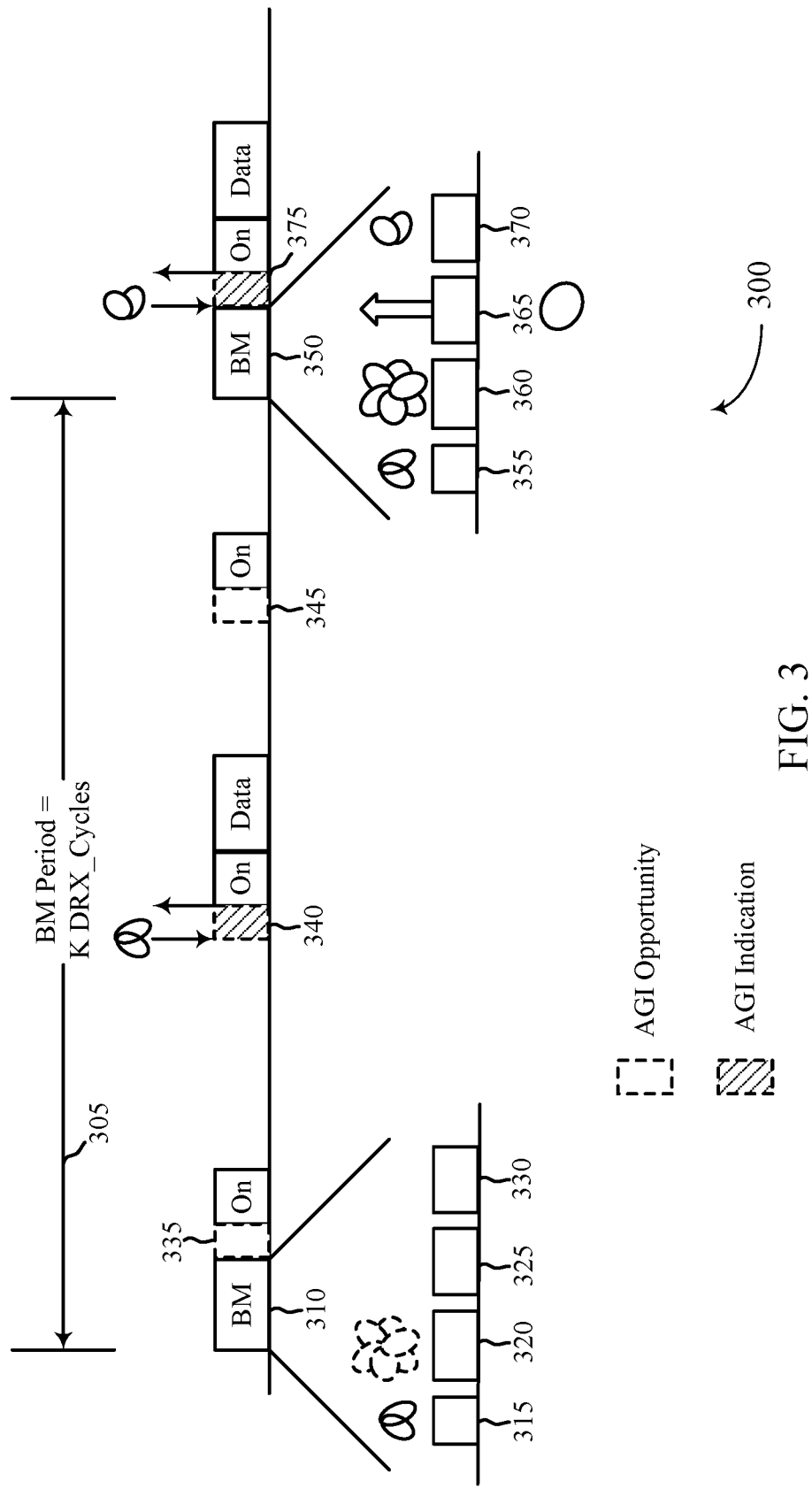
FIG. 3 illustrates an example of a wakeup configuration that supports beam management for C-DRX with AGI in accordance with aspects of the present disclosure.

FIG. 3 illustrates an example of a wakeup configuration 300 that supports beam management for C-DRX with AGI in accordance with various aspects of the present disclosure. In some examples, wakeup configuration 300 may implement aspects of wireless communication system 100 and/or wakeup configuration 200. Aspects of wakeup configuration 300 may be implemented by a UE and/or a base station, which may be examples of the corresponding devices described herein. Broadly, wakeup configuration 300 illustrates one example of periodic beam management procedures for AGI over reference signals.

A UE may be configured with a beam management period 305 that covers a number of DRX cycles (e.g., K DRX_cycles), e.g., the integer value K may be selected depending on the beam coherence, and the like. A DRX cycle includes the UE transitioning between an On Duration and sleep state. In the example wakeup configuration 300, the value K is four, meaning that a periodic beam management procedure may be performed between the UE and the base station before every fourth instance of the UE transitioning to the On Duration. The beam management procedure 310 is scheduled according to the beam management period 305.

At each periodic beam management occasion (once per K DRX cycles), such as beam management procedure 310, the network may reserve resources to use for a possible beam recovery procedure. During a period 315 (referred to as 1DL) the resources may include periodic CSI-RS or SS for N AGI reference beams, two transmit beams being shown by way of example. During a period 320 (referred to as 2DL) the resources may include periodic CSI-RS or SS for candidate beam search. For example, the base station may beam sweep the reference beams using a set of transmit beams that covers all or a subset of the coverage area of the base station. In the period 320, the reference beams are shown in dashed line to indicate that, in some instances, the base station may always transmit reference beams during both 1DL and 2DL at each beam management occasion. During period 325 (referred to as 3UL) the resource opportunity provides for a scheduling request (SR) or physical random access channel (PRACH) transmission from the UE for beam recovery. During period 330 (referred to as 4DL) the resource opportunity provides for the response signal from the base station to the beam recovery request from the UE.

In some aspects, such as is shown during beam management procedure 310, if at least one of the transmit beams in the reference signals is acceptable (e.g., has a performance metric at or above a threshold), the periods 320, 325, and 330 may not be triggered. In some aspects, from the base station perspective the periodic reference signals at period 320 may always be transmitted. However, from the UE perspective the UE may not monitor for the reference signals during the period 320 if at least one of the transmit beams from period 310 are performing at or above a performance threshold. Accordingly, the set of transmit beams used during the period 315 may then be used at the next available AGI opportunity where the base station has data to transmit to the UE.

At AGI opportunity 335 the base station may not have data to transmit to the UE and therefore may refrain from transmitting a wakeup signal. Accordingly, the UE may transition to a sleep state and skip the following On Duration. At AGI opportunity 340, the base station may determine that it has data to transit to the UE and may therefore transmit the wakeup signal to the UE using the set of transmit beams (e.g., the same set of transmit beams confirmed acceptable during the beam management procedure 310). The UE may respond by transmitting a response signal to the base station confirming that the UE received the AGI indication in the wakeup signal. Accordingly, at the following On Duration the UE may transition to a fully functional state and receive the PDCCH signal carrying the resource grant for the data.

At the next AGI opportunity, the base station may again determine that there is no data to transmit to the UE and therefore refrain from transmitting the wakeup signal. The UE may determine that no wakeup signal was transmitted and therefore skip the following On Duration by transitioning to the sleep state.

During the next beam management opportunity (e.g., beam management procedure 350), the base station may transmit a reference signal using the same transmit beams (e.g., the same set of transmit beams used for the wakeup signal transmitted during AGI opportunity 340) during the period 355 (or 1DL). During period 360 (2DL) the base station may transmit periodic CSI-RS or SS for a candidate beam search. For example, the base station may beam sweep the reference beams using a set of transmit beams that covers all or a subset of the coverage area of the base station. By monitoring the reference signals at period 355, the UE may determine that the quality of all transmit beams used by the reference signals at period 355 are below a performance threshold and the UE may start the beam failure recovery procedure and proceed to period 360 to search for candidate beams. During period 365 (3UL) the resource opportunity provides for a SR or PRACH transmission from the UE for beam recovery. The transmission from the UE may indicate a transmit beam from the set of transmit beams transmitted during the period 360 that satisfies a performance threshold (e.g., a beam index). The UE may use a broad beam configuration to transmit the response signal during period 365. During period 370 (4DL) the resource opportunity provides for the response signal from the base station to the beam recovery request from the UE. The response signal from the base station may be transmitted using the new set of transmit beams (e.g., a second set of transmit beams identified during the during the period 360) that can be used for future transmissions of the wakeup signal to the UE.

At the next AGI opportunity 375 the base station may determine that there is data to transmit to the UE and transmit the wakeup signal using the second set of transmit beams. The UE may respond with a response signal transmitted to the base station and transition to a fully functional mode during the next On Duration to receive the PDCCH signal. The UE may receive the data transmitted from the base station using the resources indicated in the PDCCH signal.

Thus, at each periodic beam management occasion, the UE may monitor N AGI reference beams at 1DL and determine whether a beam failure event occurs. In some aspects, a beam failure condition may include a reference signal received power (RSRP) of N reference beams are all below a performance threshold. If the beam failure event occurs, the UE may start the beam recovery procedure at 2DL/3UL/4DL. In some aspects, if at least one reference beam has an acceptable performance quality, steps 2DL/3UL/4DL may not be triggered.

The number of beam management occasions may be determined by selection of the integer value of K DRX_cycles and may include N transmit beams in the set of transmit beams. In some aspects, a performance tradeoff for the selection of the parameters K DRX_cycles and N transmit beams may be made. For a larger K value and smaller N value, the UE power consumption for monitoring reference beams and AGI signal (e.g., wakeup signal transmit beams) is smaller, but beam failure probability may be higher. With a higher beam failure probability, the data latency may be higher and UE's power consumption may also increase due to the need of transmitting beam recovery signal. Once a beam failure event occurs, UE has to wait until the next periodic beam management occasion for beam recovery, so the worst case delay is K DRX_cycles. In some aspects, the beam failure probability is dictated by ratio of K DRX_cycles versus coherence time of the best transmit beam out of the N AGI transmit beams.

Figure 4:
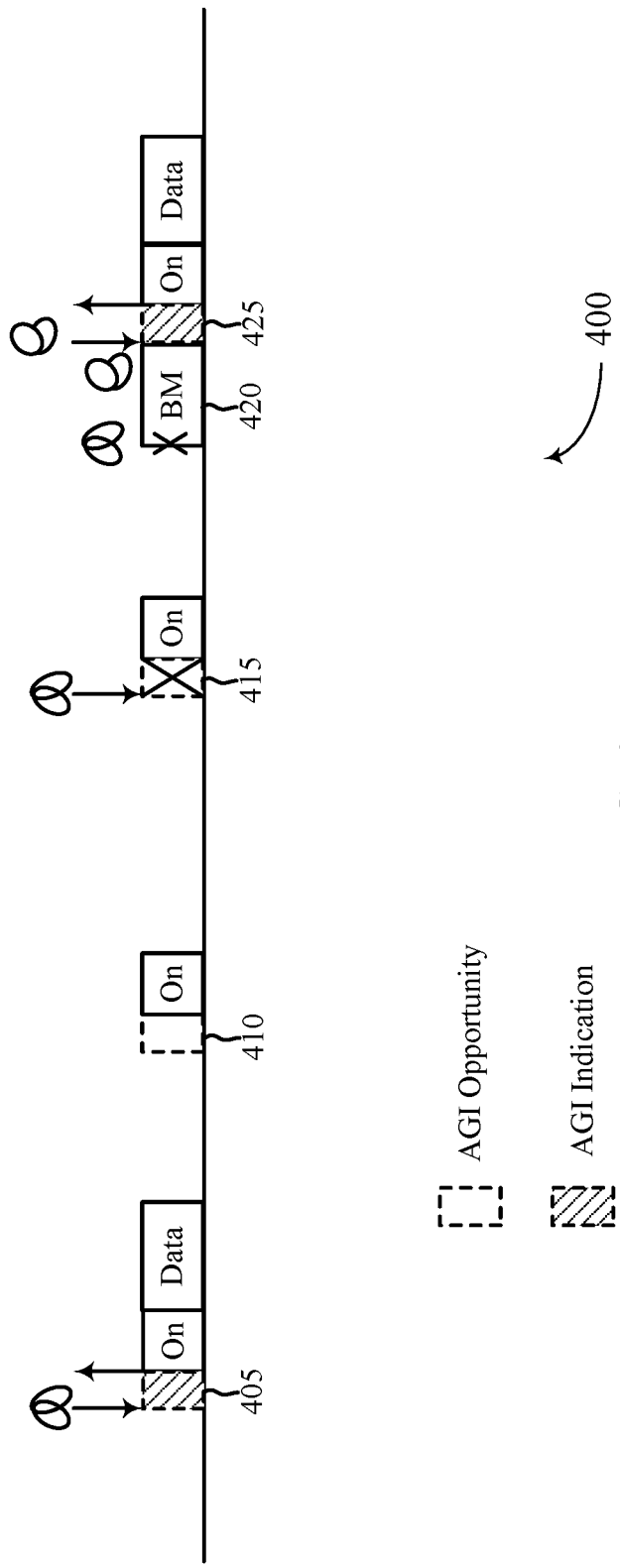
FIG. 4 illustrates an example of a wakeup configuration that supports beam management for C-DRX with AGI in accordance with aspects of the present disclosure.

FIG. 4 illustrates an example of a wakeup configuration 400 that supports beam management for C-DRX with AGI in accordance with various aspects of the present disclosure. In some examples, wakeup configuration 400 may implement aspects of wireless communication system 100 and/or wakeup configurations 200/300. Aspects of wakeup configuration 400 may be implemented by a UE and/or a base station, which may be examples of the corresponding devices described herein. Broadly, wakeup configuration 400 illustrates one example of a response to acknowledge an AGI indication for traffic.

In some aspects, there is always a non-zero probability for a beam failure event during an AGI transmission (e.g., wakeup signal transmission). To prevent a C-DRX state mismatch, aspects of the present disclosure include the UE responding to an AGI indication with a response signal when there is data available to transmit to the UE. In a beam failure scenario where the UE misses the AGI transmission due to beam failure, the base station may not receive the UE's response signal and, based on the failure to receive a response, may not schedule any PDCCH transmission for the upcoming DRX On Duration. This may prevent triggering a radio link failure (RLF) due to C-DRX state mismatch.

At the first AGI opportunity 405, the base station may determine that there is data to be transmitted to the UE and therefore transmit the wakeup signal indicating that data is available (e.g., the AGI indication illustrated by the down arrow). The wakeup signal may be transmitted using the set of transmit beams in a beam sweeping configuration. The transmit beams in the set of transmit beams may be selected based on a previous beam management and/or beam update procedure between the base station and the UE (not shown). The UE may respond to the wakeup signal by transmitting a response signal indicating that the UE has received the AGI indication (illustrated by the up arrow). Based on receiving the response signal, the base station may schedule the PDCCH signal transmission during the following On Duration that carries the resource grant for the following data transmission.

At the next AGI opportunity 410, the base station may determine that there is no data to transmit to the UE and therefore not transmit a wakeup signal. Upon not detecting a wakeup signal transmission, the UE may transition to a sleep state and skip the following On Duration.

At the next AGI opportunity 415, the base station may determine that there is data available to be transmitted to the UE. Accordingly, the base station may transmit a wakeup signal to the UE with the AGI indication and using the same set of transmit beams (e.g., the currently active transmit beams). However, one or more of the transmit beams in the set of transmit beams may have a performance metric below a threshold (e.g., due to movement of the UE) and therefore the UE may not receive the wakeup signal. Accordingly, the UE may not respond to the wakeup signal by not transmitting a response signal. This is illustrated in the AGI opportunity 415 by an X. This may constitute a C-DRX state mismatch/beam failure event.

Based on the base station detecting the beam failure event (e.g., by not receiving the response signal from the UE), the base station may trigger a beam management procedure 420 with the UE. The beam management procedure 420 may include the base station transmitting a reference signal to the UE using the current set of transmit beams (e.g., at the 1DL). The base station may also transmit reference signals using another set of transmit beams that includes the current transmit beams and adds additional transmit beams (e.g., at the 2DL). The transmit beams in the 2DL step may cover all or a subset of directions of the coverage area of the base station. The UE may respond during the 3UL period with an indication of the best transmit beams from the transmit beams used in the 2DL period, e.g., a beam index of the transmit beam having the highest receive power level, the lowest interference level, etc. Accordingly, at the 4DL period the base station may respond by transmitting the second set of transmit beams as the new transmit beams for future transmissions of the wakeup signal to the UE.

At the next AGI opportunity 425, the base station may transmit the wakeup signal to the UE using the second set (e.g., updated set) of transmit beams. The wakeup signal may carry the AGI indication and the UE may respond with a response signal confirming receipt of the AGI indication. Accordingly, the base station may schedule and transmit the PDCCH signal during the following On Duration and the data using the indicated resources. Thus, in this instance the recovery period (e.g., traffic delay) may be limited to the next beam management opportunity.

In some aspects, the AGI response (e.g., the response signal) may be transmitted over pre-configured physical uplink control channel (PUCCH) resources. For example, if an AGI indication with N transmit beams, N symbols may also be used for the AGI response so that the base station may sweep over N receive beams. Costs associated with this technique may include the reserved uplink resource for each C-DRX cycle with little uplink traffic. Due to analog beam constraint, these symbols may not be allocated to other users of different directions. In some aspects, the AGI response (e.g., the response signal from the UE) may include additional information such as an AGI beam status report.

An AGI beam status report may include a beam metric, such as RSRP, for the AGI transmit beams (e.g., the set of transmit beams used to transmit the wakeup signal). The base station may do further beam management based on the UE's AGI beam status report, e.g., further beam management for regular PDCCH or for the next AGI transmission. In some aspects, the AGI beam status report may always be included in the AGI response, e.g., in every response signal received from the UE. The UE may only send an AGI response when there is traffic, so power consumption may be minimal. In some aspects, the AGI beam status report is event triggered based on a beam measurement, e.g., one or more performance metrics of the transmit beams used to transmit the wakeup signal. For example, the network (e.g., the RRC layer) may configure an event triggered beam status report from UE. Some possible triggering conditions may include when the AGI is decoded successfully over at least one transmit beam, but some other AGI transmit beams have unacceptable quality.

Figure 5:
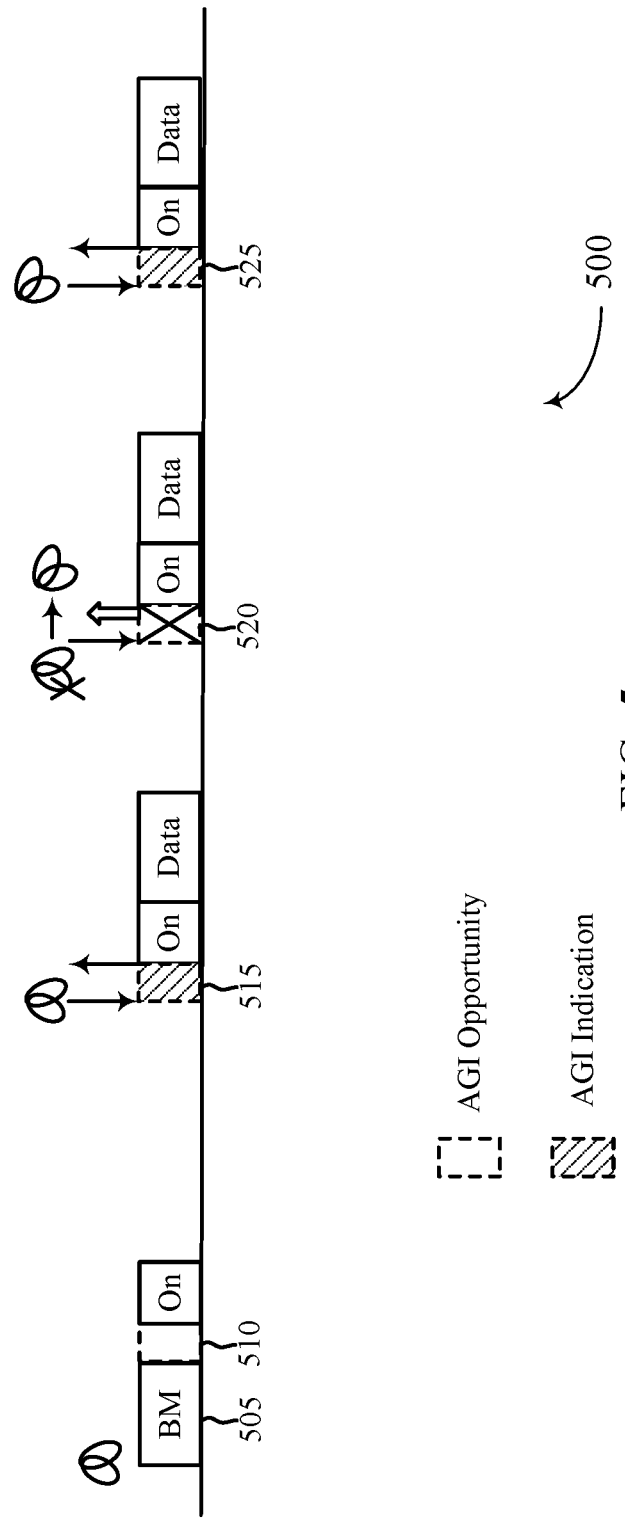
FIG. 5 illustrates an example of a wakeup configuration that supports beam management for C-DRX with AGI in accordance with aspects of the present disclosure.

FIG. 5 illustrates an example of a wakeup configuration 500 that supports beam management for C-DRX with AGI in accordance with various aspects of the present disclosure. In some examples, wakeup configuration 500 may implement aspects of wireless communication system 100 and/or wakeup configurations 200/300/400. Aspects of wakeup configuration 500 may be implemented by a UE and/or a base station, which may be examples of the corresponding devices described herein. Broadly, wakeup configuration 500 illustrates one example of an opportunistic beam management for AGI.

In some aspects, AGI techniques may benefit form opportunistic beam management for AGI. Opportunistic beam management may be applicable when the AGI indication is transmitted over N>1 beams. If an AGI indication with traffic is detected, the UE may send the AGI beam status report to the base station. If the quality of some of the transmit beams used to transmit the AGI indication (e.g., wakeup signal) are below a performance threshold, the base station may trigger an aperiodic CSI-RS beam sweep for the UE to find candidate transmit beams to replace the poor AGI transmit beams. In some aspects, the opportunistic beam update procedure may only be triggered when the AGI indication with traffic is detected and some of the transmit beams are poor. The opportunistic beam management may reduce the overall beam failure rate.

At the beam management procedure 505, the base station may transmit reference signal(s) to the UE using the current set of active transmit beams, e.g., the most recently updated set of transmit beams. The current set of transmit beams may be performing above a performance threshold and therefore the beam management procedure 505 may result in the current transmit beams being maintained as the active set of transmit beams. At the AGI opportunity 510, the base station may determine that there is no data to transmit to the UE and therefore refrain from transmitting a wakeup signal. Thus, the UE may transition to a sleep state and skip the following On Duration.

At the AGI opportunity 515, the base station may determine that there is data to be transmitted to the UE and therefore transmit the wakeup signal indicating that data is available (e.g., the AGI indication illustrated by the down arrow). The wakeup signal may be transmitted using the set of transmit beams in a beam sweeping configuration. The transmit beams in the set of transmit beams may be selected based on the beam management procedure 505. The UE may respond to the wakeup signal by transmitting a response signal indicating that the UE has received the AGI indication (illustrated by the up arrow). Based on receiving the response signal, the base station may schedule the PDCCH signal transmission during the following On Duration that carries the resource grant for the following data transmission.

At the AGI opportunity 520, the base station may determine that there is data to be transmitted to the UE and therefore transmit the wakeup signal indicating that data is available (e.g., the AGI indication illustrated by the down arrow). The wakeup signal may be transmitted using the set of transmit beams in a beam sweeping configuration. The transmit beams in the set of transmit beams may be selected based on the beam management procedure 505. However, at least one of the transmit beams in the set of transmit beams may be performing below a performance threshold and this may trigger an opportunistic beam update procedure with the base station.

For example, the UE may transmit a response signal that includes a beam status report. The beam status report may carry or otherwise indicate that at least one of the transmit beams in the current set of transmit beams is performing below the performance threshold. This may trigger the beam update procedure where the base station transmits aperiodic reference signals (e.g., CSI-RSs) in a beam sweeping configuration. The UE may monitor for the aperiodic reference signal transmissions to identify a candidate beam to replace the transmit beam that is performing below the performance threshold. The UE may respond again (e.g., with a second response signal/beam status report) that identifies the candidate beams for the base station. The response signal from the UE may also confirm receipt of the AGI indication (e.g., that was received via the transmit beam performing above the performance threshold). Thus, the base station may update the current active set of transmit beams based on the candidate beam(s) identified by the UE. The base station may use the updated set of transmit beams to schedule and transmit the PDCCH signal during the following On Duration.

At the next AGI opportunity 525, the base station may again determine that there is data to be transmitted to the UE and therefore transmit the wakeup signal indicating that data is available (e.g., the AGI indication illustrated by the down arrow). The wakeup signal may be transmitted using the updated set of transmit beams in a beam sweeping configuration. The updated transmit beams in the set of transmit beams may be selected based on the opportunistic beam update procedure during the AGI opportunity 520. The UE may respond to the wakeup signal by transmitting a response signal indicating that the UE has received the AGI indication (illustrated by the up arrow). Based on receiving the response signal, the base station may schedule the PDCCH signal transmission during the following On Duration that carries the resource grant for the following data transmission.

In some aspects, the described techniques may include beam management for PDCCH signaling after an AGI indication with traffic. For example, further beam management may be triggered for regular PDCCH after AGI reception. The further beam management may use different approaches, depending on implementation. In some aspects, the set of transmit beams used for transmitting the PDCCH signal may or may not be the same as the set of transmit beams used for transmitting the AGI indication (e.g., wakeup signal). In one approach, a set of coarse transmit beams are used for the AGI indication, while a set of fine transmit beams are used for the PDCCH signal. The base station may schedule aperiodic CSI-RS transmissions for beam refinement for regular PDCCH signals after the AGI beam status report is received from the UE. In another approach, a subset of top AGI transmit beams may be used to transmit the regular PDCCH signal. The base station may select active transmit beams for the PDCCH signal based on UE's AGI beam status report included in AGI response signal.

Figure 6:
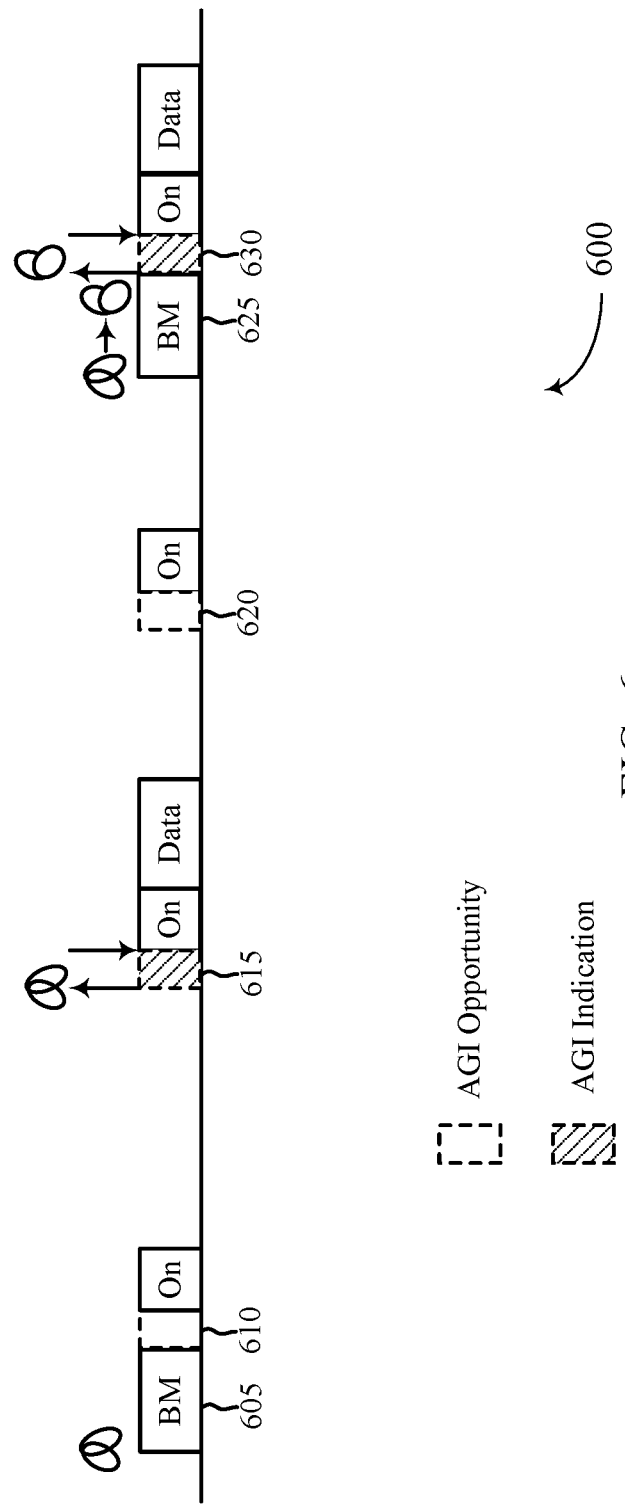
FIG. 6 illustrates an example of a wakeup configuration that supports beam management for C-DRX with AGI in accordance with aspects of the present disclosure.

FIG. 6 illustrates an example of a wakeup configuration 600 that supports beam management for C-DRX with AGI in accordance with various aspects of the present disclosure. In some examples, wakeup configuration 600 may implement aspects of wireless communication system 100 and/or wakeup configurations 200/300/400/500. Aspects of wakeup configuration 600 may be implemented by a UE and/or a base station, which may be examples of the corresponding devices described herein. Broadly, wakeup configuration 600 illustrates one example of an uplink traffic case for C-DRX with AGI.

Broadly, the wakeup configuration 600 is similar to aspects of the wakeup configurations 200/300/400/500. However, in the uplink data situation the UE may transmit a SR to carry or otherwise convey the AGI indication during the AGI opportunity. For example, the UE may determine that it has data to transmit to the base station and transmit the SR at the AGI opportunity. This may be followed by further beam management/updates for the regular PDCCH and/or SR reception.

At the beam management procedure 605, the base station and UE may perform a beam management procedure using the transmit beams in the currently active set of transmit beams. Provided that the transmit beams are performing at or above a performance threshold, the beam management procedure 605 may conclude with no changes to the transmit beams in the set of transmit beams.

At AGI opportunity 610, the base station may determine that there is no data to be transmitted to the UE and therefore refrain from transmitting the wakeup signal. Accordingly, the UE may transition to a sleep state and skip the following On Duration.

At some point after the AGI opportunity 610 and before the next AGI opportunity 615, uplink data may arrive at the UE for transmission to the base station. Therefore, at the AGI opportunity 615 the UE may transmit a SR using the transmit beams corresponding to the reference beams (e.g., the same set of transmit beams being used by the base station). The SR may include the AGI indication informing the base station that the UE has uplink data to transmit. The SR transmission is indicated by the up arrow. The base station may respond (indicated by the down arrow) with a response signal confirming receipt of the AGI indication. Accordingly, the base station may schedule and transmit a PDCCH signal during the following On Duration that includes a grant of resources to be used by the UE to transmit the uplink data (e.g., physical uplink shared channel (PUSCH) resource grant). The UE may use the indicated resources to transmit the uplink data to the base station.

At AGI opportunity 620, the base station may determine that there is no data to be transmitted to the UE and therefore refrain from transmitting the wakeup signal. Accordingly, the UE may transition to a sleep state and skip the following On Duration.

At some point after the AGI opportunity 620 and before the beam management procedure 625, uplink data may arrive at the UE for transmission to the base station. However, at least one of the transmit beams in the active set of transmit beams may be performing below a performance threshold. Accordingly, a second updated set of transmit beams may be identified during the beam management procedure 625.

Therefore, at the AGI opportunity 630 the UE may transmit a SR using the updated transmit beams corresponding to the reference beams (e.g., the updated set of transmit beams). The SR may include the AGI indication informing the base station that the UE has uplink data to transmit. The SR transmission is indicated by the up arrow. The base station may respond (indicated by the down arrow) with a response signal confirming receipt of the AGI indication. Accordingly, the base station may schedule and transmit a PDCCH signal during the following On Duration that includes a grant of resources to be used by the UE to transmit the uplink data (e.g., PUSCH resource grant). The UE may use the indicated resources to transmit the uplink data to the base station.

Figure 7:
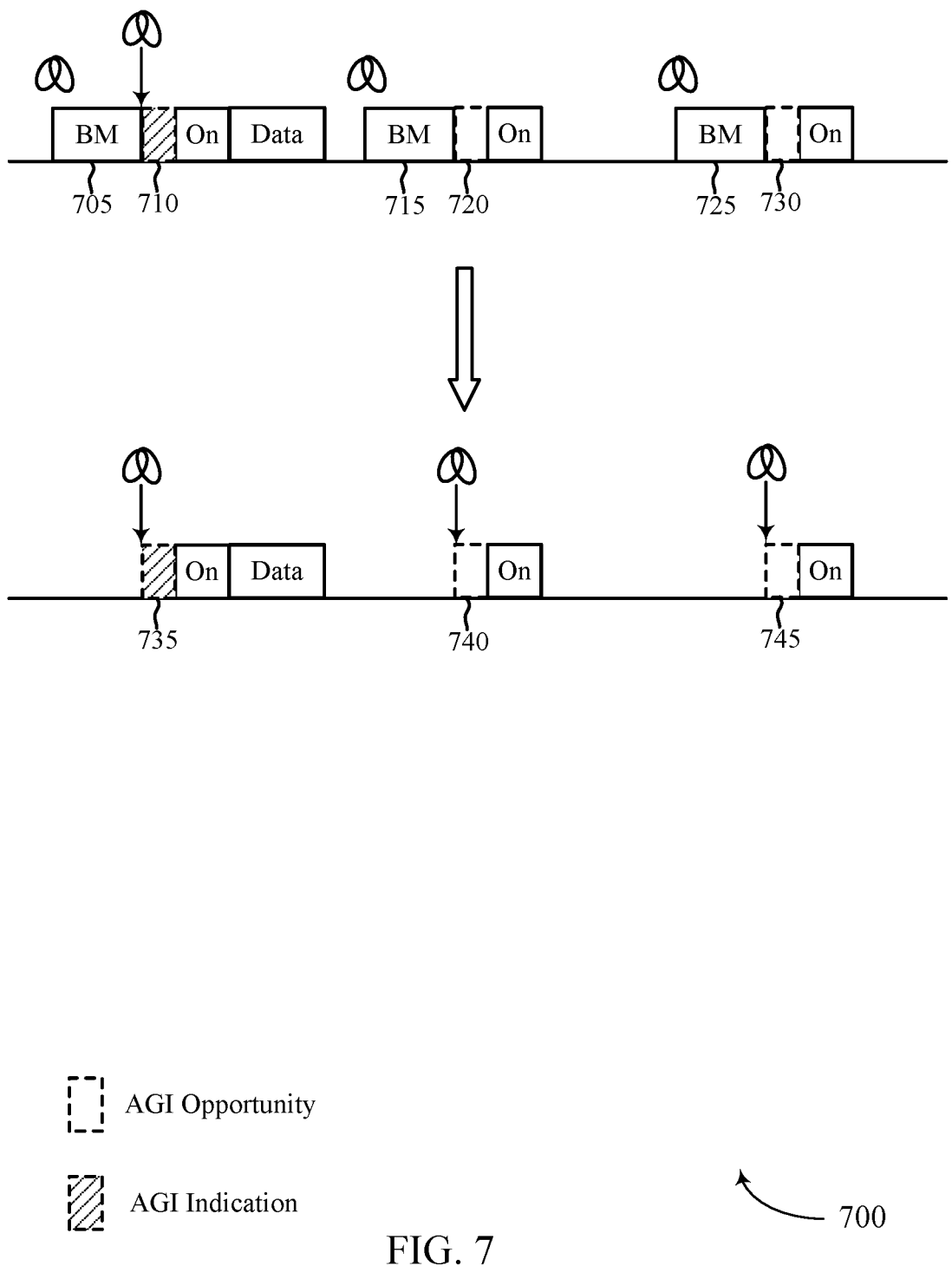
FIG. 7 illustrates an example of a wakeup configuration that supports beam management for C-DRX with AGI in accordance with aspects of the present disclosure.

FIG. 7 illustrates an example of a wakeup configuration 700 that supports beam management for C-DRX with AGI in accordance with various aspects of the present disclosure. In some examples, wakeup configuration 700 may implement aspects of wireless communication system 100 and/or wakeup configurations 200/300/400/500/600. Aspects of wakeup configuration 700 may be implemented by a UE and/or a base station, which may be examples of the corresponding devices described herein. Broadly, wakeup configuration 700 illustrates one example of full sweep beam management.

In some aspects, a beam management procedure is performed at every DRX cycle, e.g., K=1. For example, beam management procedure 705 is performed prior to AGI opportunity 710 (e.g., an AGI opportunity with data available to transmit to the UE). Another beam management procedure 715 is performed before AGI opportunity 720 (e.g., an AGI opportunity with no data available to transmit to the UE). And another beam management procedure 725 is performed before AGI opportunity 730 (e.g., another AGI opportunity with no data available to transmit to the UE). In some aspects, this technique may minimize the opportunity for a C-DRX state mismatch situation, but at the added expense of increased power consumption at the UE. The AGI beam management quality may be monitored over periodic CSI-RS or SS transmissions.

In some aspects, the AGI is transmitted over a full set of beams over all directions. This technique may be used when the size of the full set of transmit beams is small and the DRX cycle is large. With a large DRX cycle and small number of transmit beams, the power consumption for AGI transmission may be minimal. Moreover, since the AGI is transmitted at every DRX cycle and in all directions, beam failure may not happen and beam management for AGI is not needed. Therefore, the network may avoid reserving periodic resources for AGI beam management. Further beam management for regular PDCCH signal transmissions may be still used if finer beams are used for the PDCCH signal transmissions.

In some aspects, explicit AGI may be used with monitor periodicity K=1 DRX_cycle. When monitoring periodic K=1 DRX cycle, some aspects may combine periodic beam management for AGI together with AGI transmissions using the explicit AGI. The explicit AGI may carry a 1-bit traffic indication that is always transmitted at every DRX_cycle. The UE may evaluate the beam quality of AGI transmit beams directly, and no separate reference beam monitor procedure may be needed. The network may still reserve resources for beam failure recovery procedure for every DRX_cycle after explicit AGI transmission.

Figure 8:
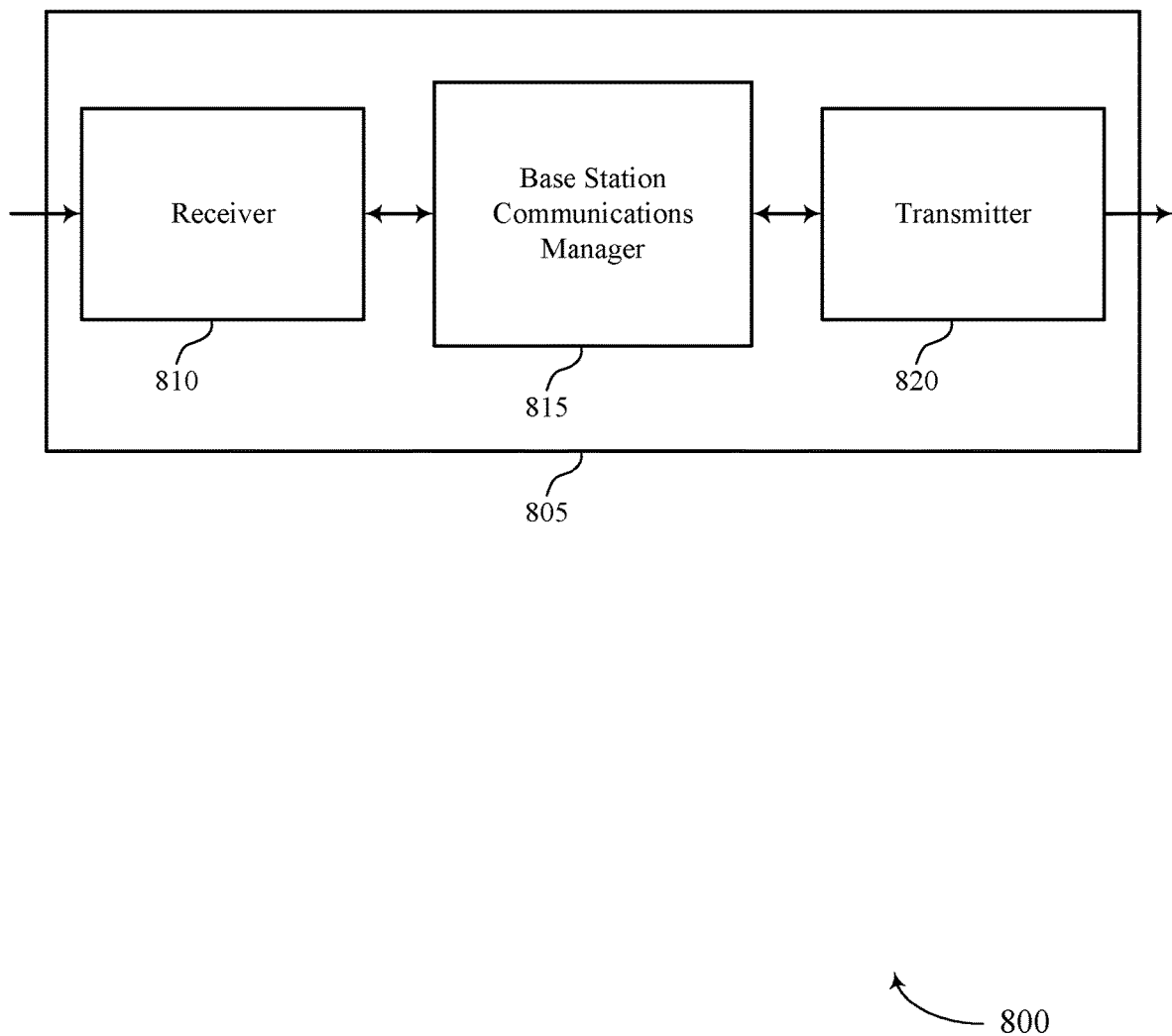
FIGS. 8 through 10 show block diagrams of a device that supports beam management for C-DRX with AGI in accordance with aspects of the present disclosure.

FIG. 8 shows a block diagram 800 of a wireless device 805 that supports beam management for C-DRX with AGI in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam management for C-DRX with AGI, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11.

Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit, to a UE operating in a DRX mode, a wakeup signal indicating whether data is available to be transmitted to the UE, the wakeup signal transmitted using a first set of transmit beams in accordance with a beam sweeping configuration, receive, from the UE and based on the wakeup signal, a response signal, and perform, based on the response signal, a beam update procedure to identify a second set of transmit beams for future transmissions of the wakeup signal to the UE. The base station communications manager 815 may also transmit, to a UE operating in a DRX mode, a wakeup signal indicating that data is available to be transmitted to the UE, the wakeup signal transmitted using a set of transmit beams in accordance with a beam sweeping configuration and receive, from the UE and based on the wakeup signal, a response signal indicating that the UE has received the indication that data is available to be transmitted to the UE.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
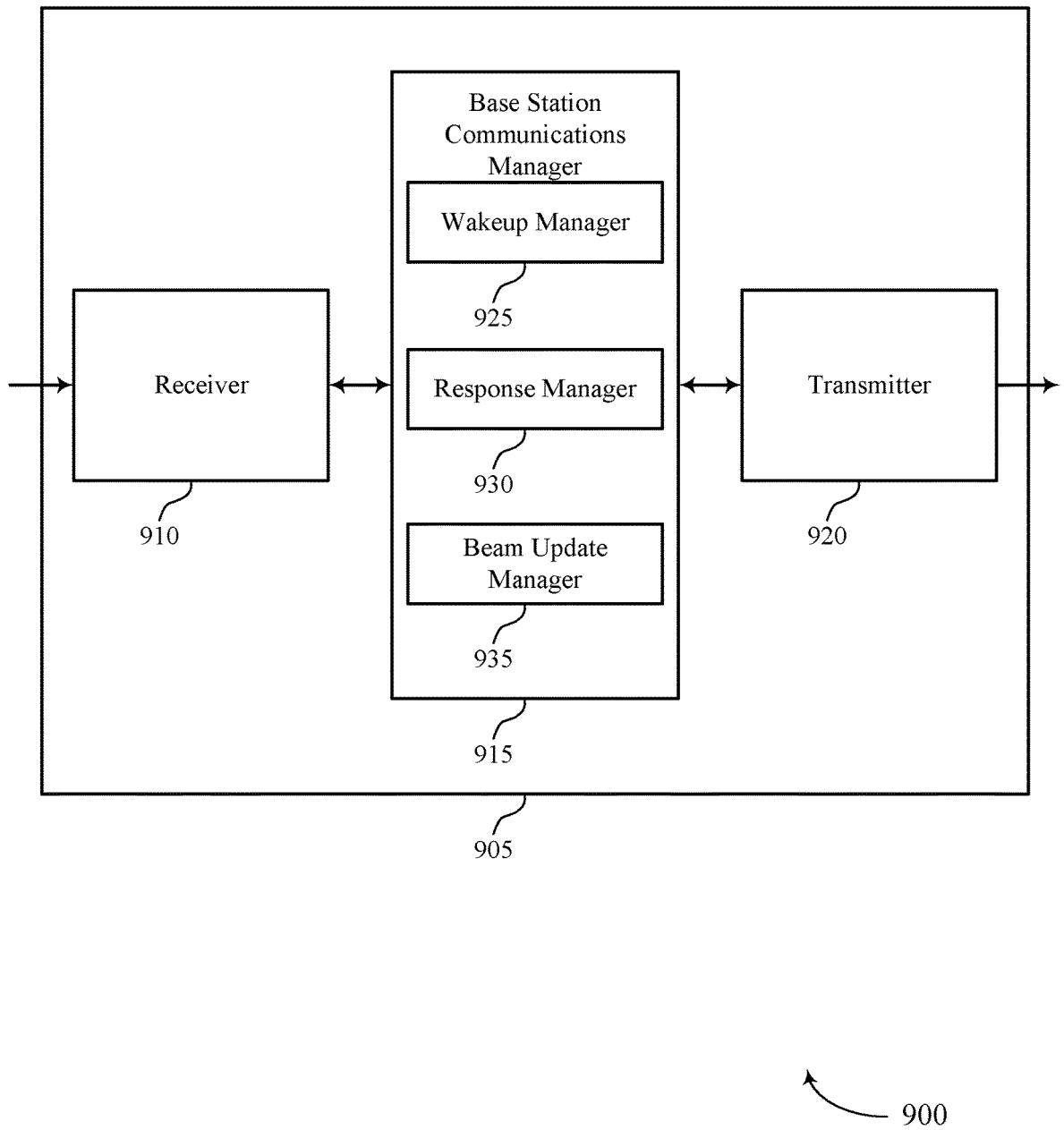

FIG. 9 shows a block diagram 900 of a wireless device 905 that supports beam management for C-DRX with AGI in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to beam management for C-DRX with AGI, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11.

Base station communications manager 915 may also include wakeup manager 925, response manager 930, and beam update manager 935.

Wakeup manager 925 may transmit, to a UE operating in a DRX mode, a wakeup signal indicating whether data is available to be transmitted to the UE, the wakeup signal transmitted using a first set of transmit beams in accordance with a beam sweeping configuration and transmit, to a UE operating in a DRX mode, a wakeup signal indicating that data is available to be transmitted to the UE, the wakeup signal transmitted using a set of transmit beams in accordance with a beam sweeping configuration. In some cases, the transmit beams in the first and second sets of transmit beams include pseudo-omni transmit beams. In some cases, the wakeup signal includes a narrowband tone, or a UE-specific reference signal, or a PDCCH including a bit that indicates that the UE is to wake up from a sleep state, or a combination thereof.

Response manager 930 may receive, from the UE and based on the wakeup signal, a response signal and receive, from the UE and based on the wakeup signal, a response signal indicating that the UE has received the indication that data is available to be transmitted to the UE. In some cases, the response signal includes a beam status report. In some cases, the beam status report is received from the UE in response to every transmission of the wakeup signal. In some cases, the beam status report is received from the UE when at least one transmit beam in the set of transmit beams is below a performance threshold. In some cases, the beam status report is transmitted to the base station when at least one transmit beam in the set of transmit beams is below a performance threshold.

Beam update manager 935 may perform, based on the response signal, a beam update procedure to identify a second set of transmit beams for future transmissions of the wakeup signal to the UE.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
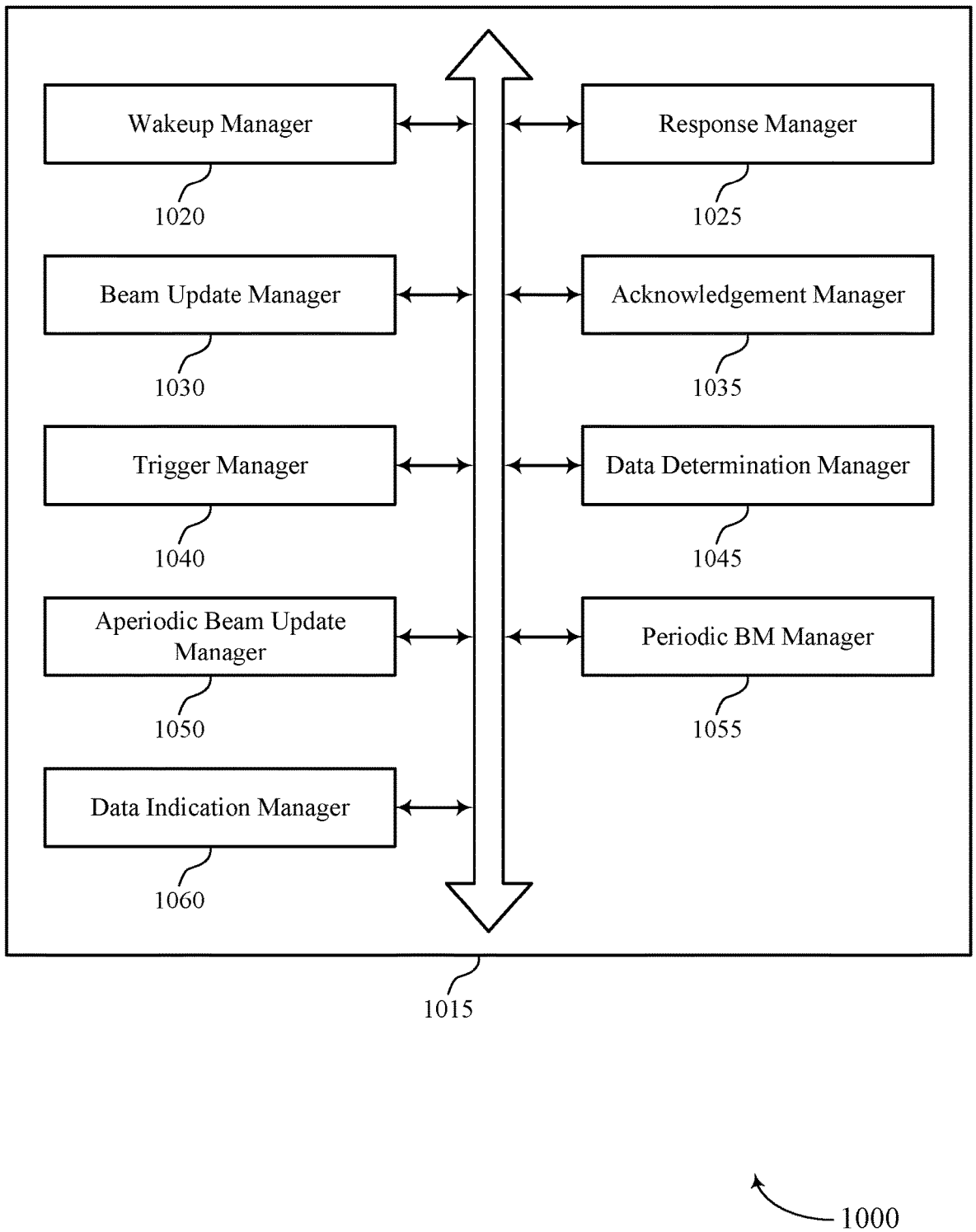

FIG. 10 shows a block diagram 1000 of a base station communications manager 1015 that supports beam management for C-DRX with AGI in accordance with aspects of the present disclosure. The base station communications manager 1015 may be an example of aspects of a base station communications manager 815, a base station communications manager 915, or a base station communications manager 1115 described with reference to FIGS. 8, 9, and 11. The base station communications manager 1015 may include wakeup manager 1020, response manager 1025, beam update manager 1030, acknowledgement manager 1035, trigger manager 1040, data determination manager 1045, aperiodic beam update manager 1050, periodic BM manager 1055, and data indication manager 1060. Each of these modules may communicate, directly or indirectly, with one another (e.g., via one or more buses).

Wakeup manager 1020 may transmit, to a UE operating in a DRX mode, a wakeup signal indicating whether data is available to be transmitted to the UE, the wakeup signal transmitted using a first set of transmit beams in accordance with a beam sweeping configuration and transmit, to a UE operating in a DRX mode, a wakeup signal indicating that data is available to be transmitted to the UE, the wakeup signal transmitted using a set of transmit beams in accordance with a beam sweeping configuration. In some cases, the transmit beams in the first and second sets of transmit beams include pseudo-omni transmit beams. In some cases, the wakeup signal includes a narrowband tone, or a UE-specific reference signal, or a PDCCH including a bit that indicates that the UE is to wake up from a sleep state, or a combination thereof.

Response manager 1025 may receive, from the UE and based on the wakeup signal, a response signal and receive, from the UE and based on the wakeup signal, a response signal indicating that the UE has received the indication that data is available to be transmitted to the UE. In some cases, the response signal includes a beam status report. In some cases, the beam status report is received from the UE in response to every transmission of the wakeup signal. In some cases, the beam status report is received from the UE when at least one transmit beam in the set of transmit beams is below a performance threshold. In some cases, the beam status report is transmitted to the base station when at least one transmit beam in the set of transmit beams is below a performance threshold.

Beam update manager 1030 may perform, based on the response signal, a beam update procedure to identify a second set of transmit beams for future transmissions of the wakeup signal to the UE.

Acknowledgement manager 1035 may configure the wakeup signal to indicate that data is available to be transmitted to the UE and receive, based on the wakeup signal, the response signal indicating that the UE has received the indication that data is available to be transmitted to the UE. In some cases, the response signal includes a beam status report. In some cases, the beam status report is received from the UE in response to every transmission of the wakeup signal. In some cases, the beam status report is received from the UE in response to the at least one transmit beam in the first set of transmit beams being below the performance threshold.

Trigger manager 1040 may transmit a trigger message to the UE, where the beam update procedure is based on the trigger message.

Data determination manager 1045 may identify that data is available to transmit to the UE and configure the wakeup signal to indicate that the data is available to be transmitted to the UE, where transmitting the wakeup signal is in response to the data being available.

Aperiodic beam update manager 1050 may schedule the beam update procedure based on the response signal, the beam update procedure including an aperiodic channel state information reference signal (channel state information (CSI)-RS) transmission.

Periodic BM manager 1055 may perform an additional beam update procedure according to a periodic schedule, based on an integer number of DRX cycles, identify a communication metric associated with communications with the UE, with other UEs, or combinations thereof, select a value for the integer number of DRX cycles based on the communication metric, perform, based at least on receiving the response signal, a beam management procedure to identify a third set of transmit beams for a PDCCH signal, the PDCCH signal indicating a grant of resources used to transmit the data to the UE, transmit the data to the UE using the indicated resources, receive, based on the PDCCH signal, an additional response signal indicating at least one transmit beam from the third set of transmit beams, perform, based at least on receiving the response signal, a beam management procedure to identify a second set of transmit beams for a PDCCH signal, the PDCCH signal indicating a grant of resources used to transmit the data to the UE, receive, based on the PDCCH signal, an additional response signal indicating at least one transmit beam from the second set of transmit beams, select, based on the indication, the at least one transmit beam to transmit the data to the UE, receive, based on the PDCCH signal, an additional response signal indicating a request for the beam management procedure, and initiate the beam management procedure with the UE based at least in response to the additional response signal. In some cases, the second set of transmit beams include a beam width narrower than a beam width of the set of transmit beams used to transmit the wakeup signal. In some cases, the additional beam update procedure includes transmission of a periodic channel state information reference signal (CSI-RS), a periodic synchronization signal, or combinations thereof. In some cases, the communication metric includes a beam coherence time, a traffic arrival statistic, or combinations thereof. In some cases, the additional beam update procedure is performed in advance of transmission of the wakeup signal within a DRX cycle. In some cases, the third set of transmit beams includes a subset of the first or second sets of transmit beams. In some cases, the third set of transmit beams includes a beam width narrower than a beam width of the first or second sets of transmit beams.

Data indication manager 1060 may configure the wakeup signal to include a bit that is transmitted when there is data available to be transmitted to the UE and configure the wakeup signal to refrain from transmitting the bit when there is no data available to be transmitted to the UE.

Figure 11:
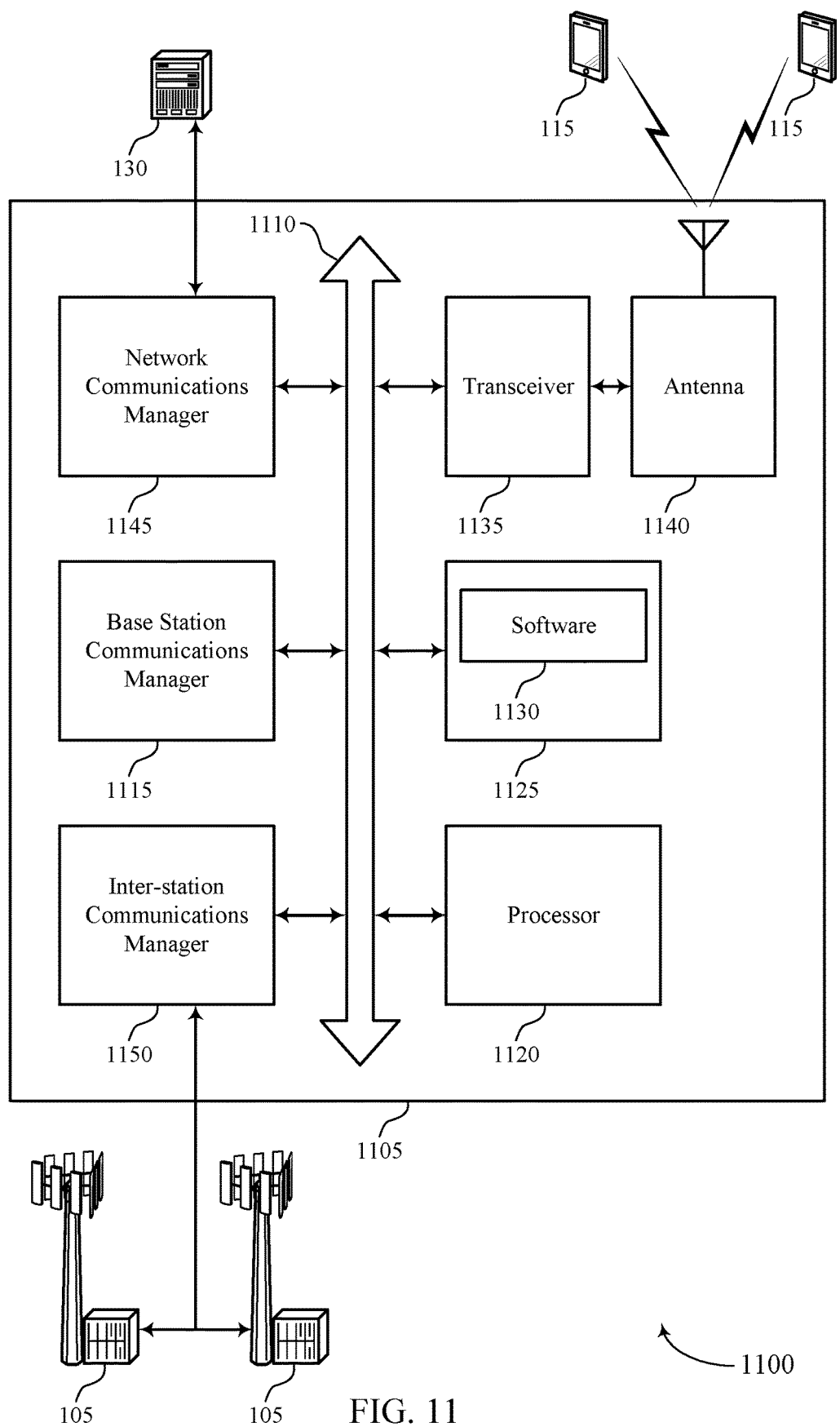
FIG. 11 illustrates a block diagram of a system including a base station that supports beam management for C-DRX with AGI in accordance with aspects of the present disclosure.

FIG. 11 shows a diagram of a system 1100 including a device 1105 that supports beam management for C-DRX with AGI in accordance with aspects of the present disclosure. Device 1105 may be an example of or include the components of wireless device 805, wireless device 905, or a base station 105 as described above, e.g., with reference to FIGS. 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting beam management for C-DRX with AGI).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support beam management for C-DRX with AGI. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
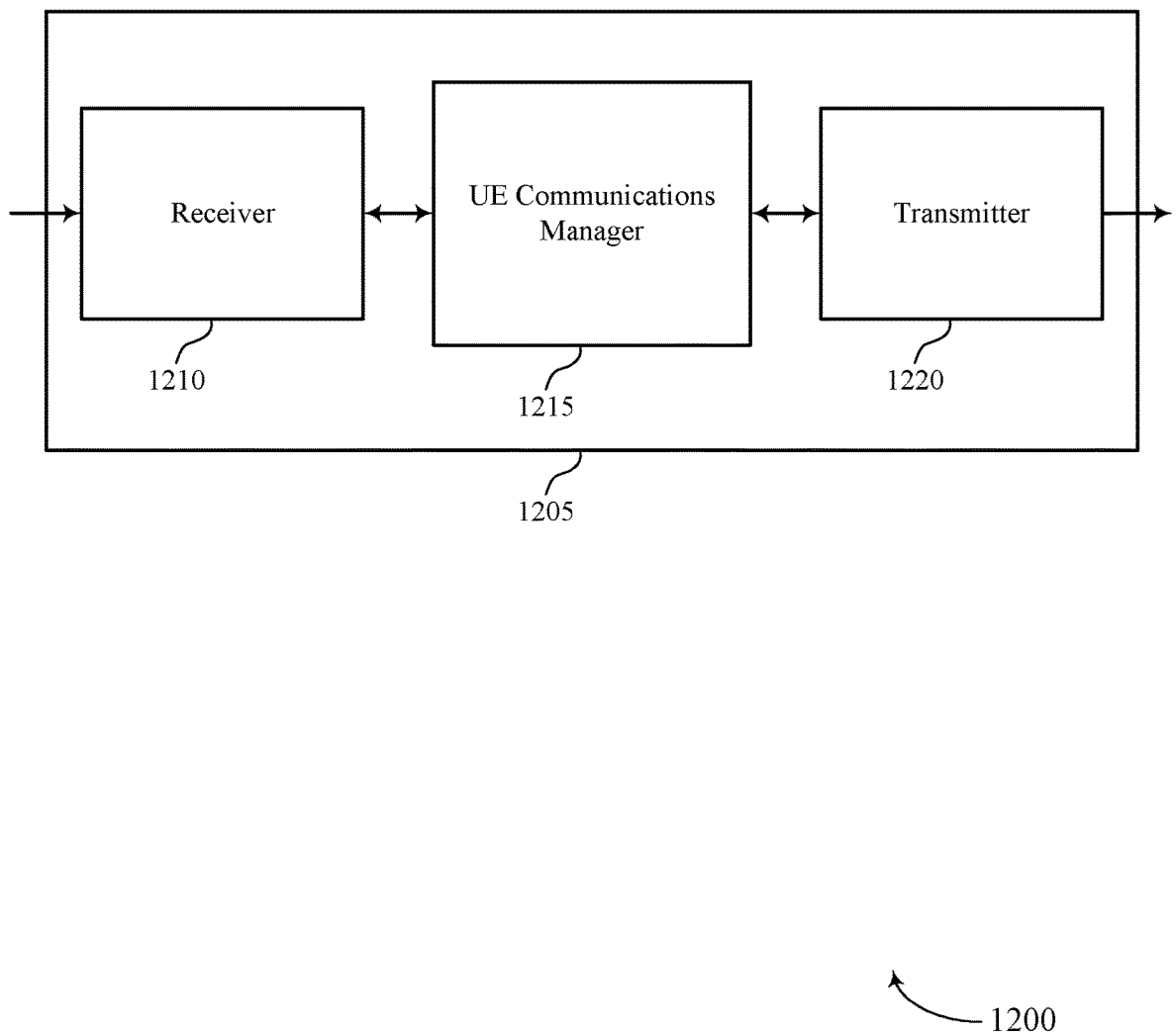
FIGS. 12 through 14 show block diagrams of a device that supports beam management for C-DRX with AGI in accordance with aspects of the present disclosure.

FIG. 12 shows a block diagram 1200 of a wireless device 1205 that supports beam management for C-DRX with AGI in accordance with aspects of the present disclosure. Wireless device 1205 may be an example of aspects of a UE 115 as described herein. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to beam management for C-DRX with AGI, etc.). Information may be passed on to other components of the device. The receiver 1210 may be an example of aspects of the transceiver 1535 described with reference to FIG. 15. The receiver 1210 may utilize a single antenna or a set of antennas.

UE communications manager 1215 may be an example of aspects of the UE communications manager 1515 described with reference to FIG. 15.

UE communications manager 1215 and/or at least some of its various sub-components may be implemented in hardware, software executed by a processor, firmware, or any combination thereof. If implemented in software executed by a processor, the functions of the UE communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1215 and/or at least some of its various sub-components may be physically located at various positions, including being distributed such that portions of functions are implemented at different physical locations by one or more physical devices. In some examples, UE communications manager 1215 and/or at least some of its various sub-components may be a separate and distinct component in accordance with various aspects of the present disclosure. In other examples, UE communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1215 may receive, from a base station and while operating in a DRX mode, a wakeup signal indicating whether data is available to be transmitted to the UE, the wakeup signal transmitted using a first set of transmit beams in accordance with a beam sweeping configuration, determine, based on the wakeup signal, that there is data available to be transmitted to the UE, transmit, based on the determining, a response signal, and perform, based on the response signal, a beam update procedure to identify a second set of transmit beams for future transmissions of the wakeup signal to the UE. The UE communications manager 1215 may also receive, from a base station and while operating in a DRX mode, a wakeup signal transmitted using a set of transmit beams in accordance with a beam sweeping configuration, determine, based on the wakeup signal, that data is available to be transmitted to the UE, and transmit a response signal to the base station indicating that the UE has received the indication that data is available to be transmitted to the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
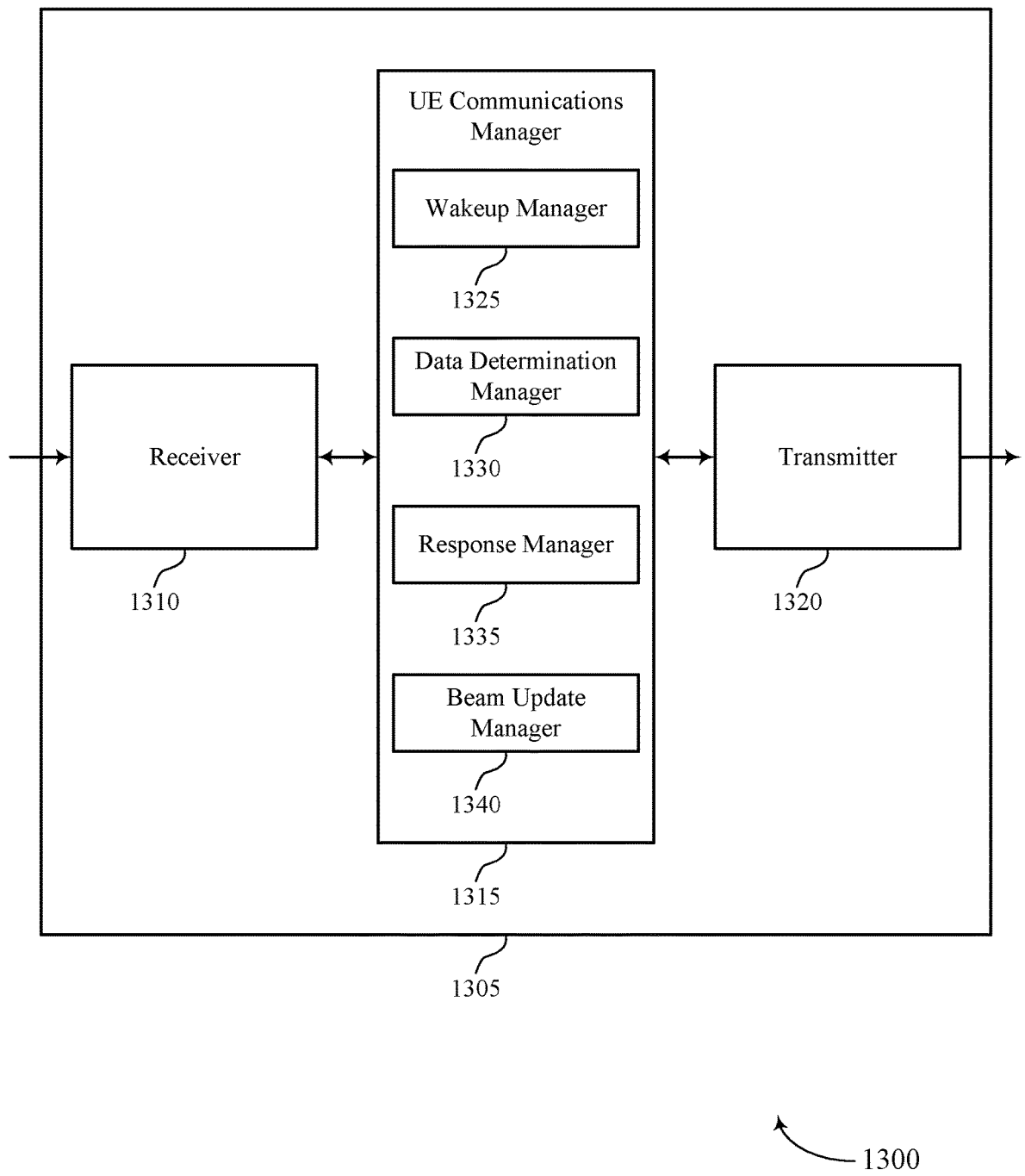

FIG. 13 shows a block diagram 1300 of a wireless device 1305 that supports beam management for C-DRX with AGI in accordance with aspects of the present disclosure. Wireless device 1305 may be an example of aspects of a wireless device 1205 or a UE 115 as described with reference to FIG. 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to beam management for C-DRX with AGI, etc.). Information may be passed on to other components of the device. The receiver 1310 may be an example of aspects of the transceiver 1535 described with reference to FIG. 15. The receiver 1310 may utilize a single antenna or a set of antennas.

UE communications manager 1315 may be an example of aspects of the UE communications manager 1515 described with reference to FIG. 15.

UE communications manager 1315 may also include wakeup manager 1325, data determination manager 1330, response manager 1335, and beam update manager 1340.

Wakeup manager 1325 may receive, from a base station and while operating in a DRX mode, a wakeup signal indicating whether data is available to be transmitted to the UE, the wakeup signal transmitted using a first set of transmit beams in accordance with a beam sweeping configuration and receive, from a base station and while operating in a DRX mode, a wakeup signal transmitted using a set of transmit beams in accordance with a beam sweeping configuration. In some cases, the transmit beams in the first and second sets of transmit beams include pseudo-omni transmit beams. In some cases, the wakeup signal includes a narrowband tone, or a UE-specific reference signal, or a PDCCH including a bit that indicates that the UE is to wake up from a sleep state, or a combination thereof.

Data determination manager 1330 may determine, based on the wakeup signal, that there is data available to be transmitted to the UE and determine, based on the wakeup signal, that data is available to be transmitted to the UE.

Response manager 1335 may transmit, based on the determining, a response signal and transmit a response signal to the base station indicating that the UE has received the indication that data is available to be transmitted to the UE. In some cases, the response signal includes a beam status report. In some cases, the beam status report is transmitted to the base station in response to every transmission of the wakeup signal. In some cases, the beam status report is transmitted to the base station in response to the at least one transmit beam in the first set of transmit beams being below the performance threshold. In some cases, the response signal includes a beam status report. In some cases, the beam status report is transmitted to the base station in response to every received wakeup signal.

Beam update manager 1340 may perform, based on the response signal, a beam update procedure to identify a second set of transmit beams for future transmissions of the wakeup signal to the UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
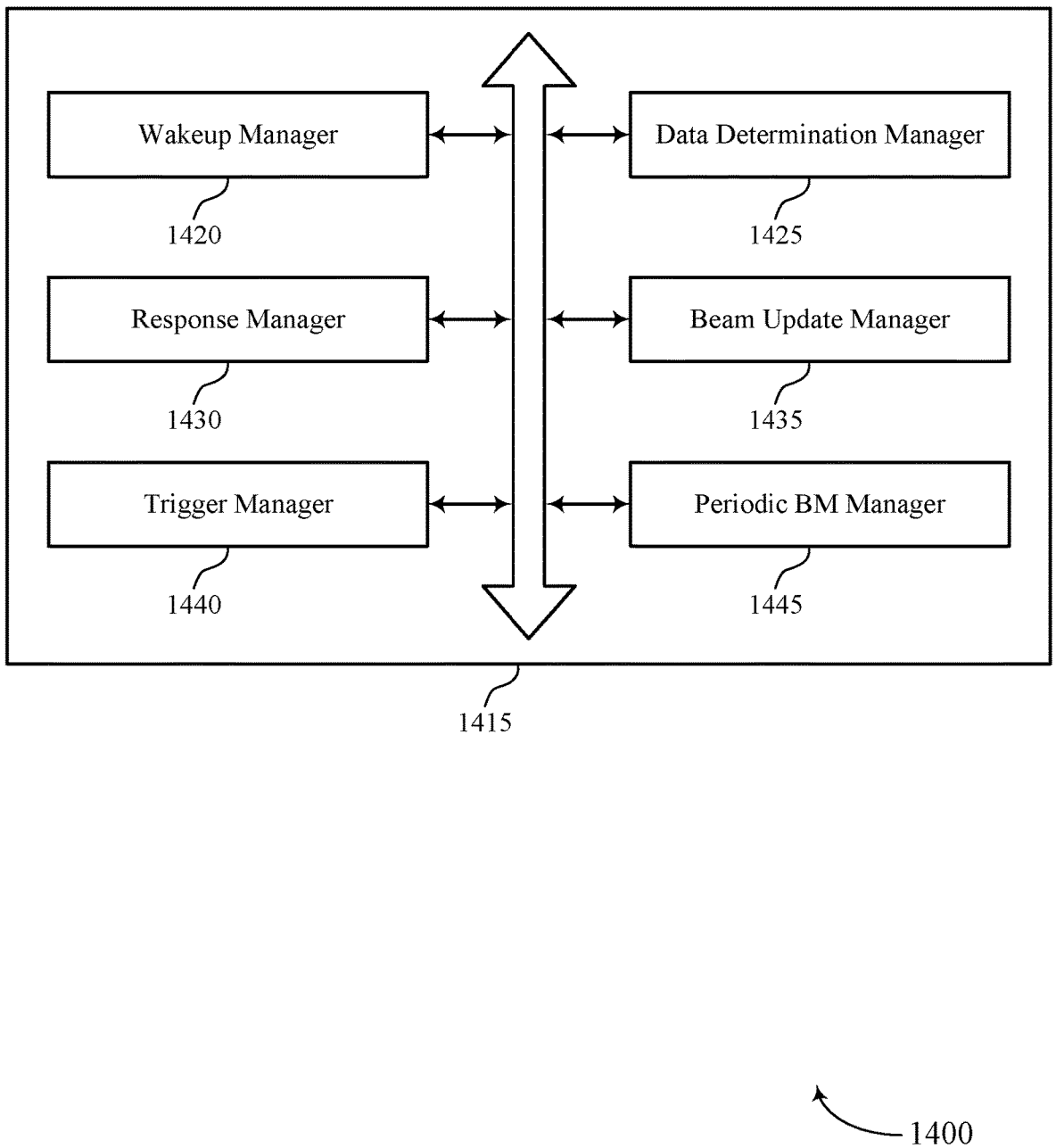

FIG. 14 shows a block diagram 1400 of a UE communications manager 1415 that supports beam management for C-DRX with AGI in accordance with aspects of the present disclosure. The UE communications manager 1415 may be an example of aspects of a UE communications manager 1515 described with reference to FIGS. 12, 13, and 15. The UE communications manager 1415 may include wakeup manager 1420, data determination manager 1425, response manager 1430, beam update manager 1435, trigger manager 1440, and periodic BM manager 1445. Each of these modules may communicate, directly or indirectly, with one another (e.g., via one or more buses).

Wakeup manager 1420 may receive, from a base station and while operating in a DRX mode, a wakeup signal indicating whether data is available to be transmitted to the UE, the wakeup signal transmitted using a first set of transmit beams in accordance with a beam sweeping configuration and receive, from a base station and while operating in a DRX mode, a wakeup signal transmitted using a set of transmit beams in accordance with a beam sweeping configuration. In some cases, the transmit beams in the first and second sets of transmit beams include pseudo-omni transmit beams. In some cases, the wakeup signal includes a narrowband tone, or a UE-specific reference signal, or a PDCCH including a bit that indicates that the UE is to wake up from a sleep state, or a combination thereof.

Data determination manager 1425 may determine, based on the wakeup signal, that there is data available to be transmitted to the UE and determine, based on the wakeup signal, that data is available to be transmitted to the UE.

Response manager 1430 may transmit, based on the determining, a response signal and transmit a response signal to the base station indicating that the UE has received the indication that data is available to be transmitted to the UE. In some cases, the response signal includes a beam status report. In some cases, the beam status report is transmitted to the base station in response to every transmission of the wakeup signal. In some cases, the beam status report is transmitted to the base station in response to the at least one transmit beam in the first set of transmit beams being below the performance threshold. In some cases, the response signal includes a beam status report. In some cases, the beam status report is transmitted to the base station in response to every received wakeup signal.

Beam update manager 1435 may perform, based on the response signal, a beam update procedure to identify a second set of transmit beams for future transmissions of the wakeup signal to the UE.

Trigger manager 1440 may receive, a trigger message from the base station, where the beam update procedure is based on the trigger message.

Periodic BM manager 1445 may perform, based at least on receiving the response signal, a beam management procedure to identify a third set of transmit beams for a PDCCH signal, the PDCCH signal indicating a grant of resources used to transmit the data to the UE, transmit, based on the PDCCH signal, an additional response signal indicating at least one transmit beam from the third set of transmit beams, where the data is received from the base station based on the at least one transmit beam, perform, based at least on receiving the response signal, a beam management procedure to identify a second set of transmit beams for a PDCCH signal, the PDCCH signal indicating a grant of resources used to transmit the data to the UE, receive the data from the base station using the indicated resources, transmit, based on the PDCCH signal, an additional response signal indicating at least one transmit beam from the second set of transmit beams, receive, based on the indication, the data transmitted using the at least one transmit beam, transmit, based on the PDCCH signal, an additional response signal indicating a request for the beam management procedure, and initiate the beam management procedure with the base station based at least in response to the additional response signal. In some cases, the second set of transmit beams include a beam width narrower than a beam width of the set of transmit beams used to transmit the wakeup signal. In some cases, the third set of transmit beams include a beam width narrower than a beam width of the first or second sets of transmit beams. In some cases, the third set of transmit beams include a subset of the first or second sets of transmit beams.

Figure 15:
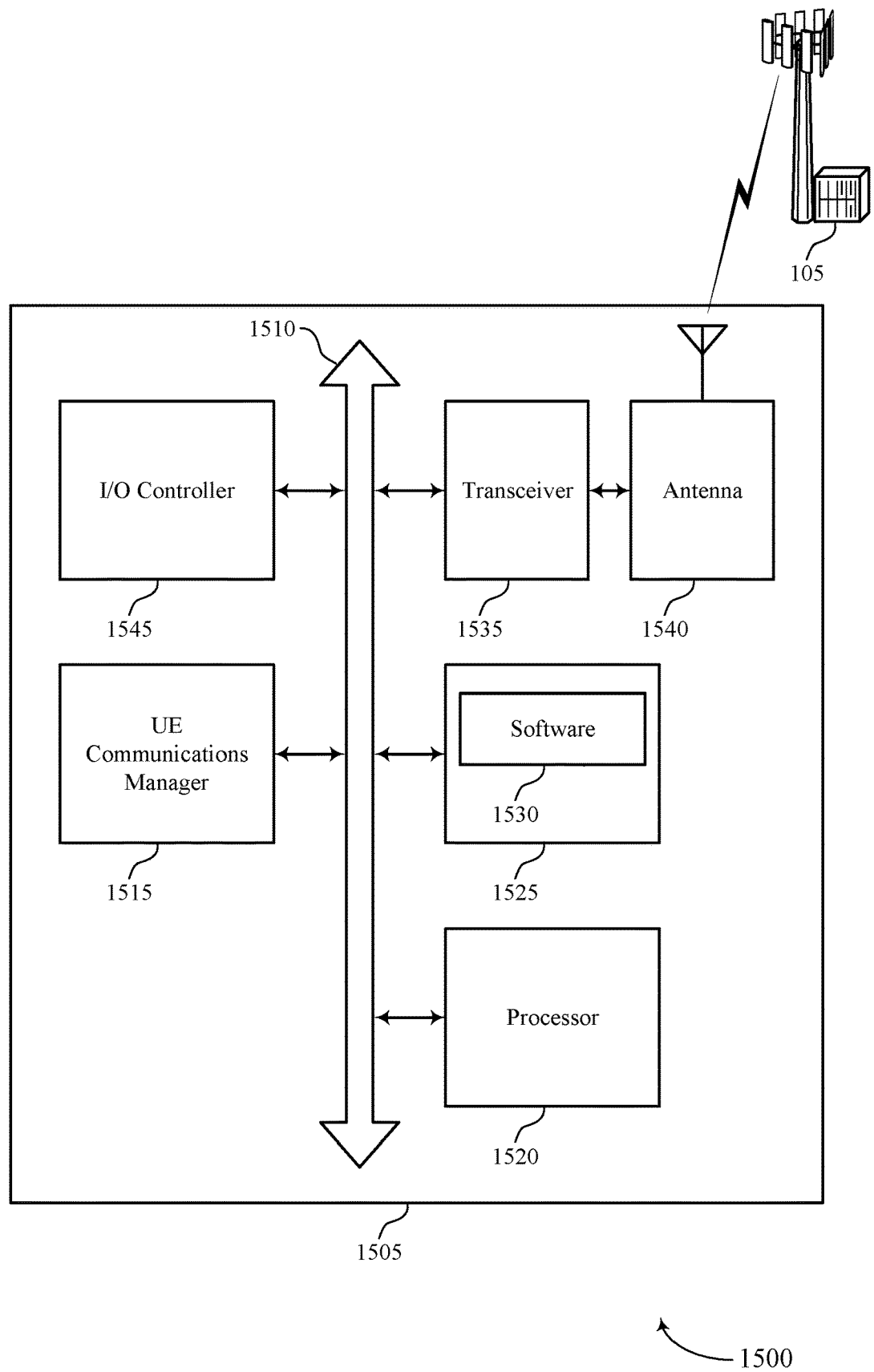
FIG. 15 illustrates a block diagram of a system including a UE that supports beam management for C-DRX with AGI in accordance with aspects of the present disclosure.

FIG. 15 shows a diagram of a system 1500 including a device 1505 that supports beam management for C-DRX with AGI in accordance with aspects of the present disclosure. Device 1505 may be an example of or include the components of UE 115 as described above, e.g., with reference to FIG. 1. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting beam management for C-DRX with AGI).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support beam management for C-DRX with AGI. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
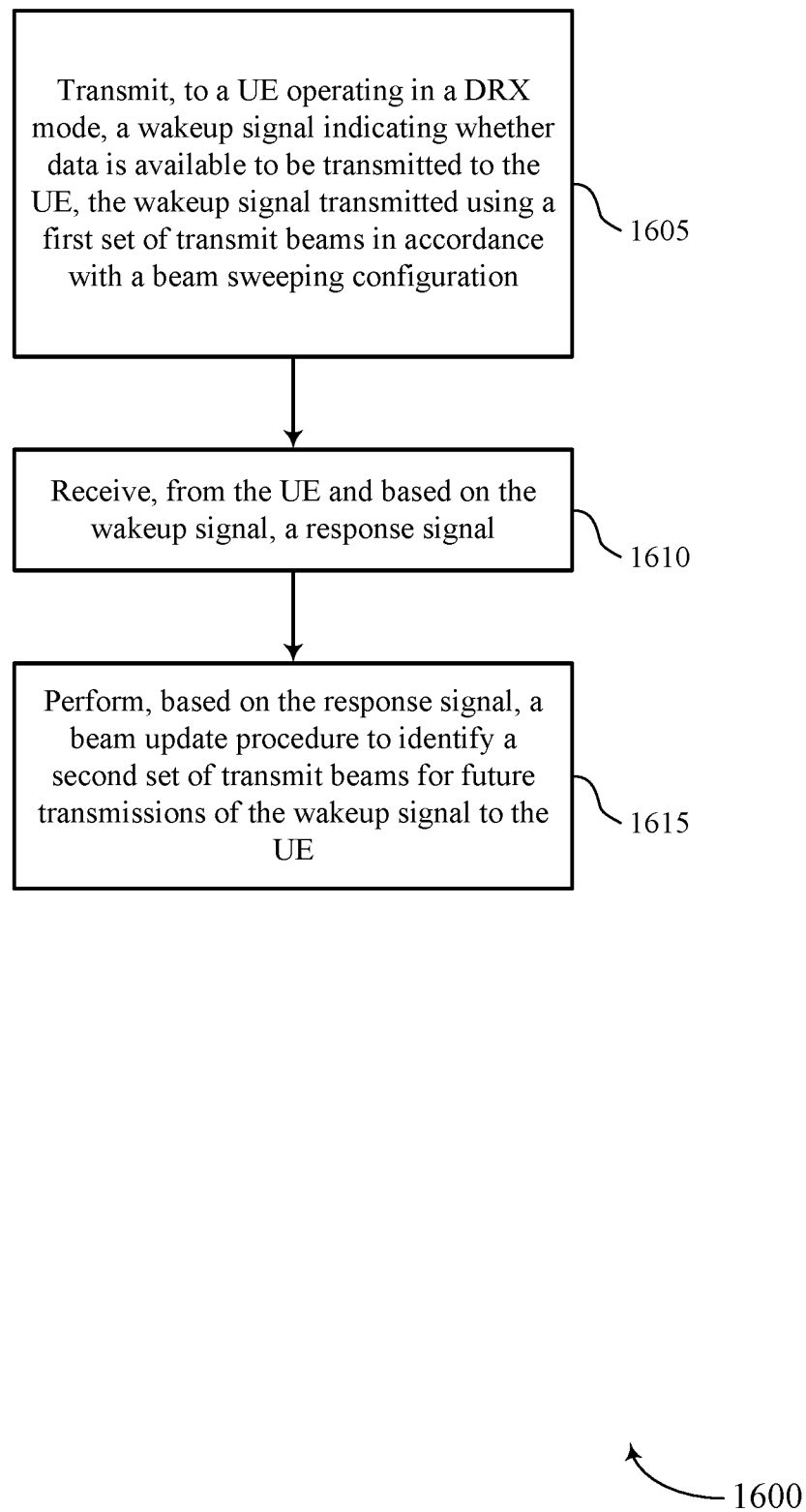
FIGS. 16 through 21 illustrate methods for beam management for C-DRX with AGI in accordance with aspects of the present disclosure.

FIG. 16 shows a flowchart illustrating a method 1600 for beam management for C-DRX with AGI in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may transmit, to a UE operating in a DRX mode, a wakeup signal indicating whether data is available to be transmitted to the UE, the wakeup signal transmitted using a first set of transmit beams in accordance with a beam sweeping configuration. The operations of block 1605 may be performed according to the methods described herein. In certain examples, aspects of the operations of block 1605 may be performed by a wakeup manager as described with reference to FIGS. 8 through 11.

At block 1610 the base station 105 may receive, from the UE and based at least in part on the wakeup signal, a response signal. The operations of block 1610 may be performed according to the methods described herein. In certain examples, aspects of the operations of block 1610 may be performed by a response manager as described with reference to FIGS. 8 through 11.

At block 1615 the base station 105 may perform, based at least in part on the response signal, a beam update procedure to identify a second set of transmit beams for future transmissions of the wakeup signal to the UE. The operations of block 1615 may be performed according to the methods described herein. In certain examples, aspects of the operations of block 1615 may be performed by a beam update manager as described with reference to FIGS. 8 through 11.

Figure 17:
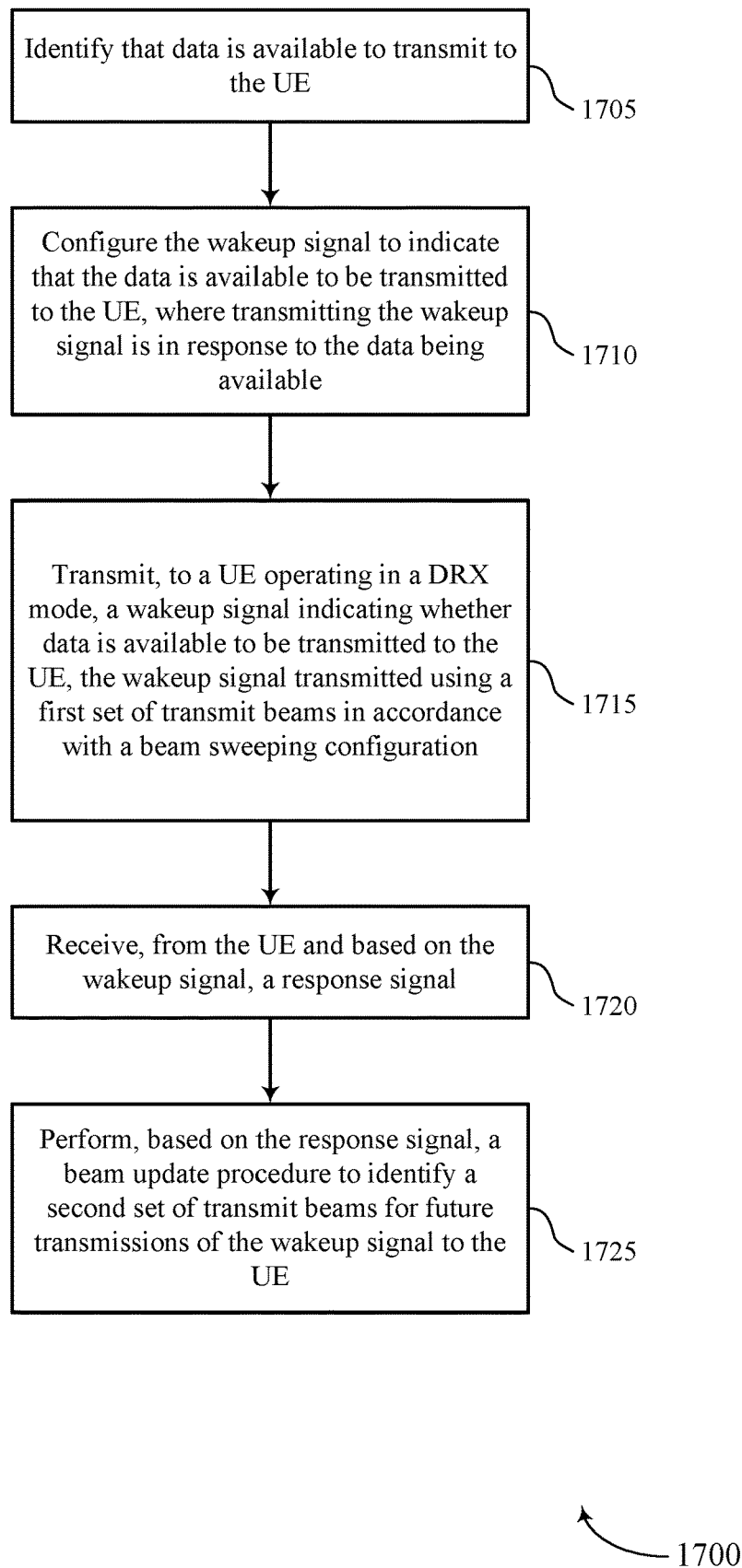

FIG. 17 shows a flowchart illustrating a method 1700 for beam management for C-DRX with AGI in accordance with aspects of the present disclosure. The operations of method 1700 may be implemented by a base station 105 or its components as described herein. For example, the operations of method 1700 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify that data is available to transmit to the UE. The operations of block 1705 may be performed according to the methods described herein. In certain examples, aspects of the operations of block 1705 may be performed by a data determination manager as described with reference to FIGS. 8 through 11.

At block 1710 the base station 105 may configure the wakeup signal to indicate that the data is available to be transmitted to the UE, wherein transmitting the wakeup signal is in response to the data being available. The operations of block 1710 may be performed according to the methods described herein. In certain examples, aspects of the operations of block 1710 may be performed by a data determination manager as described with reference to FIGS. 8 through 11.

At block 1715 the base station 105 may transmit, to a UE operating in a DRX mode, a wakeup signal indicating whether data is available to be transmitted to the UE, the wakeup signal transmitted using a first set of transmit beams in accordance with a beam sweeping configuration. The operations of block 1715 may be performed according to the methods described herein. In certain examples, aspects of the operations of block 1715 may be performed by a wakeup manager as described with reference to FIGS. 8 through 11.

At block 1720 the base station 105 may receive, from the UE and based at least in part on the wakeup signal, a response signal. The operations of block 1720 may be performed according to the methods described herein. In certain examples, aspects of the operations of block 1720 may be performed by a response manager as described with reference to FIGS. 8 through 11.

At block 1725 the base station 105 may perform, based at least in part on the response signal, a beam update procedure to identify a second set of transmit beams for future transmissions of the wakeup signal to the UE. The operations of block 1725 may be performed according to the methods described herein. In certain examples, aspects of the operations of block 1725 may be performed by a beam update manager as described with reference to FIGS. 8 through 11.

Figure 18:
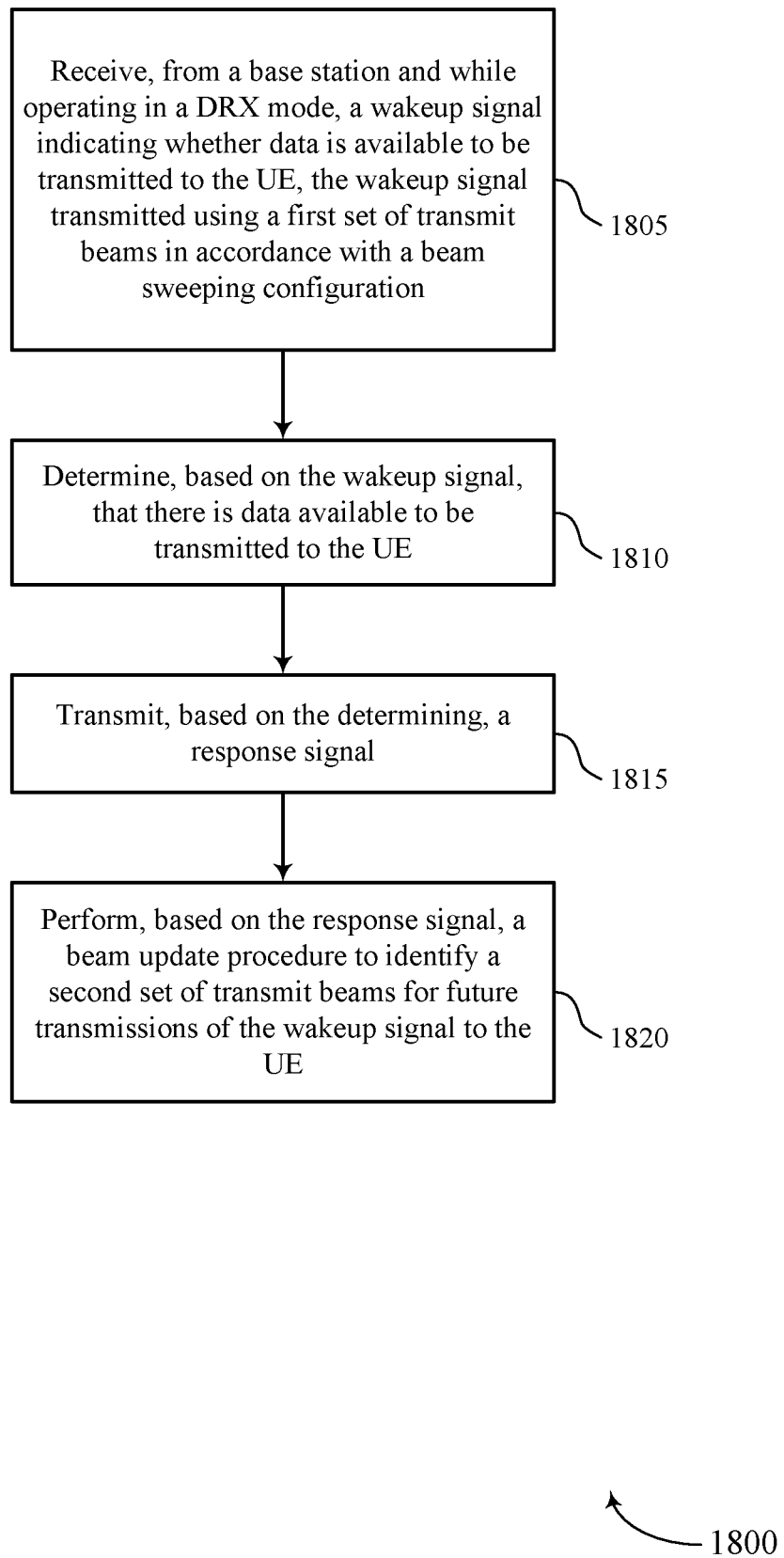

FIG. 18 shows a flowchart illustrating a method 1800 for beam management for C-DRX with AGI in accordance with aspects of the present disclosure. The operations of method 1800 may be implemented by a UE 115 or its components as described herein. For example, the operations of method 1800 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, from a base station and while operating in a DRX mode, a wakeup signal indicating whether data is available to be transmitted to the UE, the wakeup signal transmitted using a first set of transmit beams in accordance with a beam sweeping configuration. The operations of block 1805 may be performed according to the methods described herein. In certain examples, aspects of the operations of block 1805 may be performed by a wakeup manager as described with reference to FIGS. 12 through 15.

At block 1810 the UE 115 may determine, based at least in part on the wakeup signal, that there is data available to be transmitted to the UE. The operations of block 1810 may be performed according to the methods described herein. In certain examples, aspects of the operations of block 1810 may be performed by a data determination manager as described with reference to FIGS. 12 through 15.

At block 1815 the UE 115 may transmit, based at least in part on the determining, a response signal. The operations of block 1815 may be performed according to the methods described herein. In certain examples, aspects of the operations of block 1815 may be performed by a response manager as described with reference to FIGS. 12 through 15.

At block 1820 the UE 115 may perform, based at least in part on the response signal, a beam update procedure to identify a second set of transmit beams for future transmissions of the wakeup signal to the UE. The operations of block 1820 may be performed according to the methods described herein. In certain examples, aspects of the operations of block 1820 may be performed by a beam update manager as described with reference to FIGS. 12 through 15.

Figure 19:
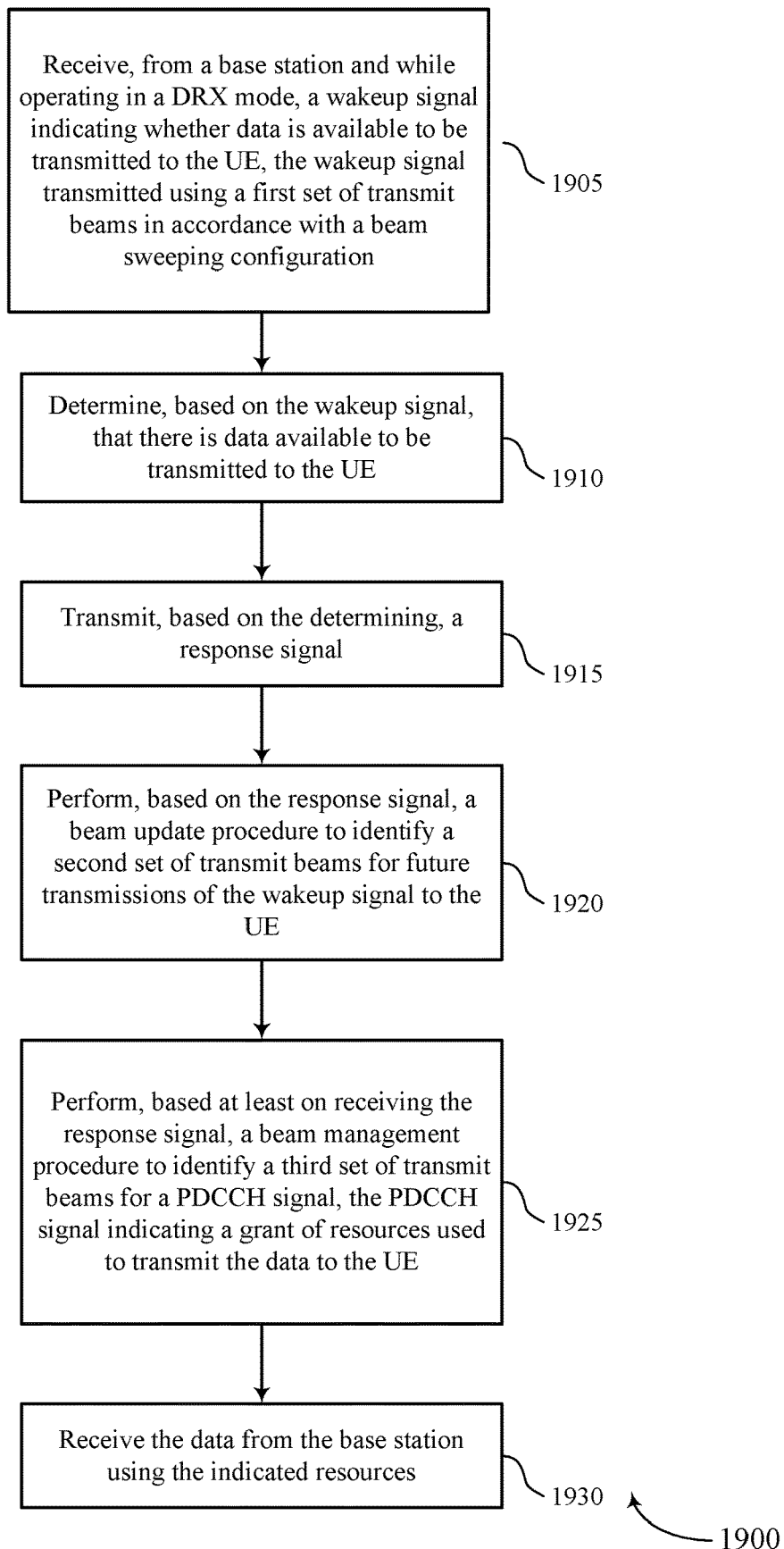

FIG. 19 shows a flowchart illustrating a method 1900 for beam management for C-DRX with AGI in accordance with aspects of the present disclosure. The operations of method 1900 may be implemented by a UE 115 or its components as described herein. For example, the operations of method 1900 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, from a base station and while operating in a DRX mode, a wakeup signal indicating whether data is available to be transmitted to the UE, the wakeup signal transmitted using a first set of transmit beams in accordance with a beam sweeping configuration. The operations of block 1905 may be performed according to the methods described herein. In certain examples, aspects of the operations of block 1905 may be performed by a wakeup manager as described with reference to FIGS. 12 through 15.

At block 1910 the UE 115 may determine, based at least in part on the wakeup signal, that there is data available to be transmitted to the UE. The operations of block 1910 may be performed according to the methods described herein. In certain examples, aspects of the operations of block 1910 may be performed by a data determination manager as described with reference to FIGS. 12 through 15.

At block 1915 the UE 115 may transmit, based at least in part on the determining, a response signal. The operations of block 1915 may be performed according to the methods described herein. In certain examples, aspects of the operations of block 1915 may be performed by a response manager as described with reference to FIGS. 12 through 15.

At block 1920 the UE 115 may perform, based at least in part on the response signal, a beam update procedure to identify a second set of transmit beams for future transmissions of the wakeup signal to the UE. The operations of block 1920 may be performed according to the methods described herein. In certain examples, aspects of the operations of block 1920 may be performed by a beam update manager as described with reference to FIGS. 12 through 15.

At block 1925 the UE 115 may perform, based at least on receiving the response signal, a beam management procedure to identify a third set of transmit beams for a PDCCH signal, the PDCCH signal indicating a grant of resources used to transmit the data to the UE. The operations of block 1925 may be performed according to the methods described herein. In certain examples, aspects of the operations of block 1925 may be performed by a periodic BM manager as described with reference to FIGS. 12 through 15.

At block 1930 the UE 115 may receive the data from the base station using the indicated resources. The operations of block 1930 may be performed according to the methods described herein. In certain examples, aspects of the operations of block 1930 may be performed by a periodic BM manager as described with reference to FIGS. 12 through 15.

Figure 20:
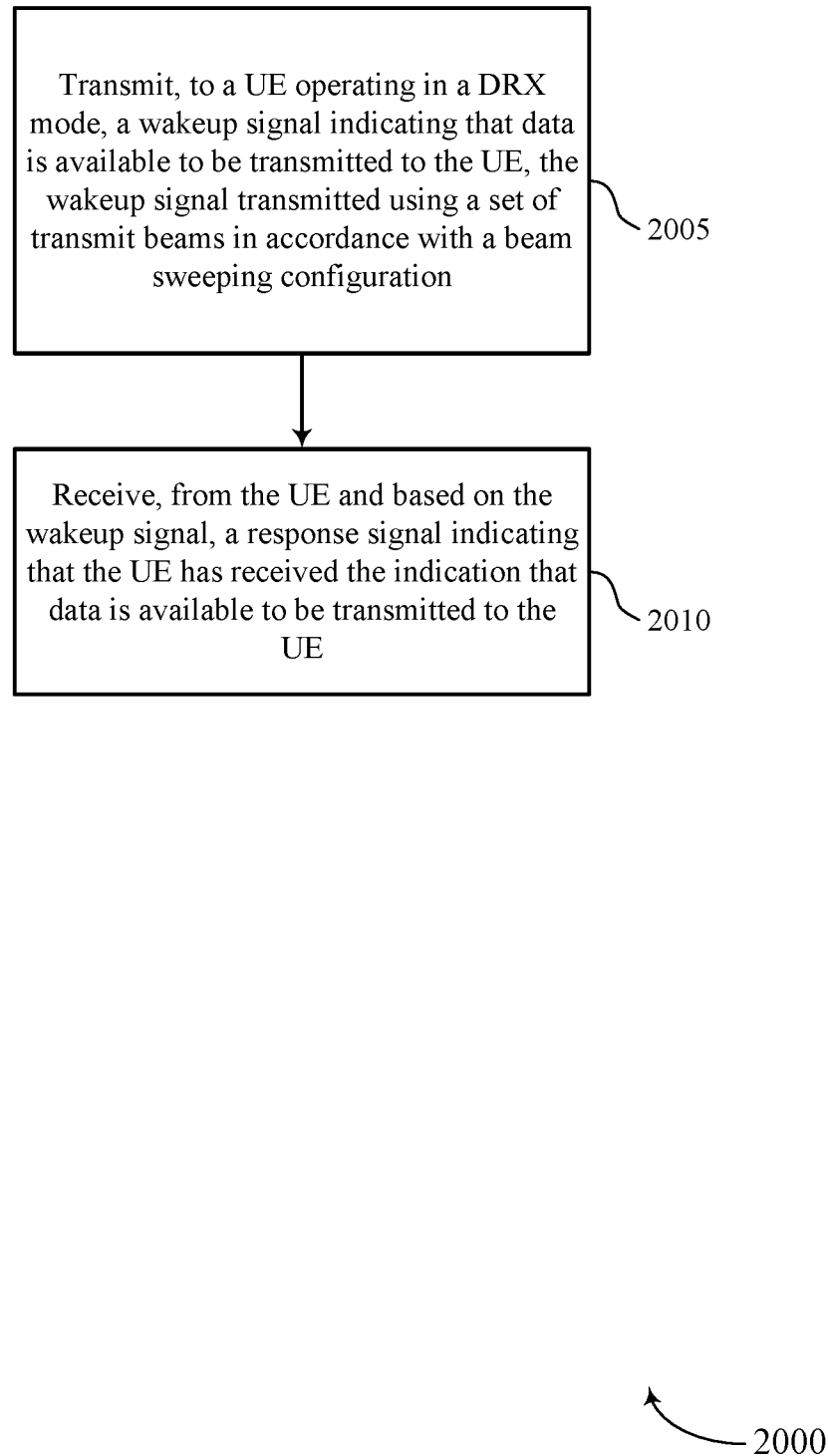

FIG. 20 shows a flowchart illustrating a method 2000 for beam management for C-DRX with AGI in accordance with aspects of the present disclosure. The operations of method 2000 may be implemented by a base station 105 or its components as described herein. For example, the operations of method 2000 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may transmit, to a UE operating in a DRX mode, a wakeup signal indicating that data is available to be transmitted to the UE, the wakeup signal transmitted using a set of transmit beams in accordance with a beam sweeping configuration. The operations of block 2005 may be performed according to the methods described herein. In certain examples, aspects of the operations of block 2005 may be performed by a wakeup manager as described with reference to FIGS. 8 through 11.

At block 2010 the base station 105 may receive, from the UE and based at least in part on the wakeup signal, a response signal indicating that the UE has received the indication that data is available to be transmitted to the UE. The operations of block 2010 may be performed according to the methods described herein. In certain examples, aspects of the operations of block 2010 may be performed by a response manager as described with reference to FIGS. 8 through 11.

Figure 21:
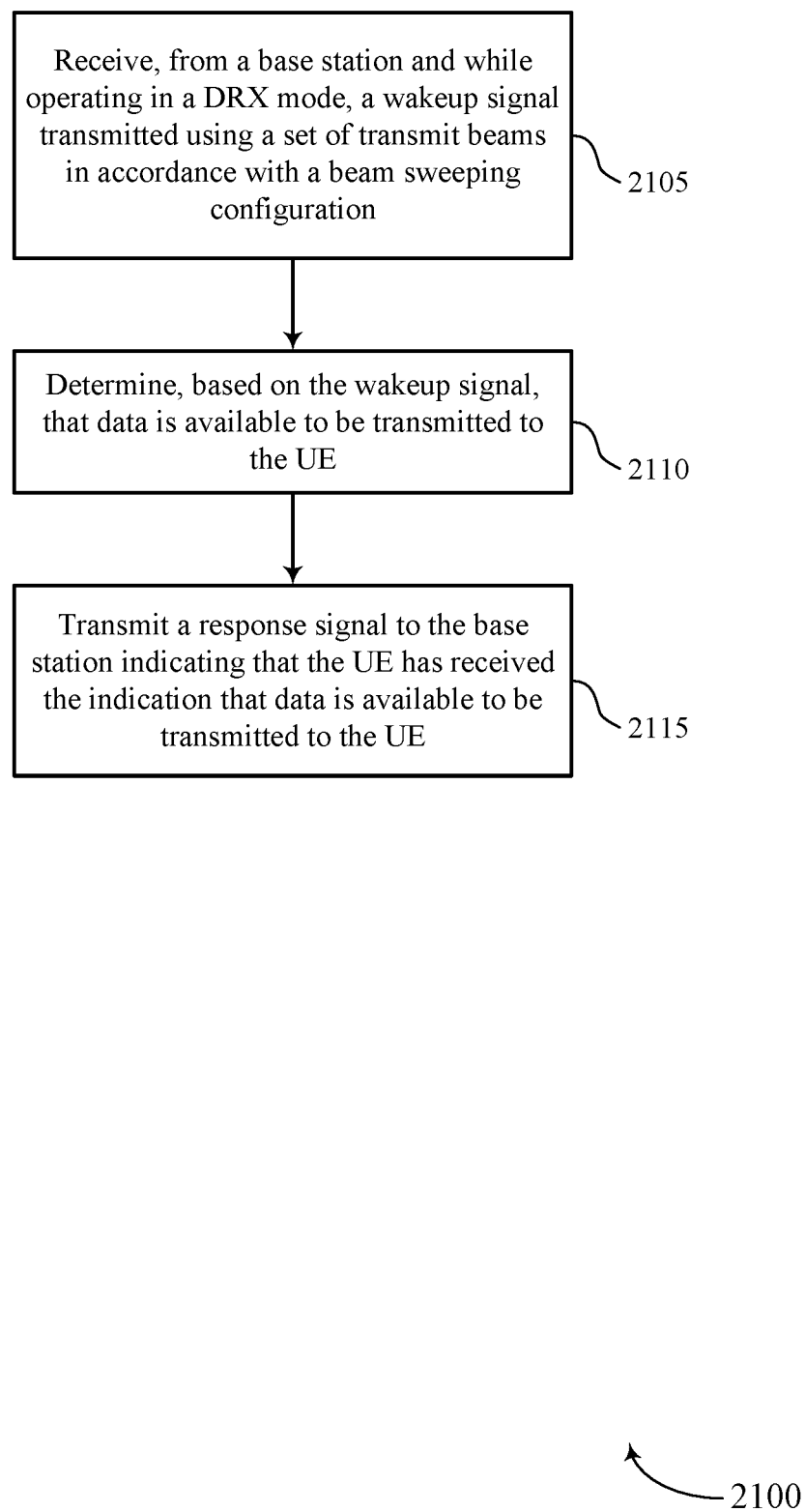

FIG. 21 shows a flowchart illustrating a method 2100 for beam management for C-DRX with AGI in accordance with aspects of the present disclosure. The operations of method 2100 may be implemented by a UE 115 or its components as described herein. For example, the operations of method 2100 may be performed by a UE communications manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive, from a base station and while operating in a DRX mode, a wakeup signal transmitted using a set of transmit beams in accordance with a beam sweeping configuration. The operations of block 2105 may be performed according to the methods described herein. In certain examples, aspects of the operations of block 2105 may be performed by a wakeup manager as described with reference to FIGS. 12 through 15.

At block 2110 the UE 115 may determine, based at least in part on the wakeup signal, that data is available to be transmitted to the UE. The operations of block 2110 may be performed according to the methods described herein. In certain examples, aspects of the operations of block 2110 may be performed by a data determination manager as described with reference to FIGS. 12 through 15.

At block 2115 the UE 115 may transmit a response signal to the base station indicating that the UE has received the indication that data is available to be transmitted to the UE. The operations of block 2115 may be performed according to the methods described herein. In certain examples, aspects of the operations of block 2115 may be performed by a response manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3 GPP). CDMA2000 and UMB are described in documents from an organization named "3rd Generation Partnership Project 2" (3 GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting, to a user equipment (UE) operating in a discontinuous reception (DRX) mode, a wakeup signal indicating whether data is available to be transmitted to the UE, the wakeup signal transmitted using a first set of transmit beams in accordance with a beam sweeping configuration;
receiving, from the UE and based at least in part on the wakeup signal, a response signal; and
performing, based at least in part on the response signal, a beam update procedure to identify a second set of transmit beams for future transmissions of the wakeup signal to the UE.

2. The method of claim 1, further comprising:
configuring the wakeup signal to indicate that data is available to be transmitted to the UE; and
receiving, based at least in part on the wakeup signal, the response signal indicating that the UE has received the indication that data is available to be transmitted to the UE.

3. The method of claim 2, wherein:
the response signal comprises a beam status report.

4. The method of claim 3, wherein:
the beam status report is received from the UE in response to every transmission of the wakeup signal.

5. The method of claim 3, wherein:
the beam status report is received from the UE in response to the at least one transmit beam in the first set of transmit beams being below the performance threshold.

6. The method of claim 1, further comprising:
transmitting a trigger message to the UE, wherein the beam update procedure is based at least in part on the trigger message.

7. The method of claim 1, further comprising:
identifying that data is available to transmit to the UE; and
configuring the wakeup signal to indicate that the data is available to be transmitted to the UE, wherein transmitting the wakeup signal is in response to the data being available.

8. The method of claim 1, further comprising:
scheduling the beam update procedure based at least in part on the response signal, the beam update procedure comprising an aperiodic channel state information reference signal (CSI-RS) transmission.

9. The method of claim 1, further comprising:
performing an additional beam update procedure according to a periodic schedule, based at least in part on an integer number of DRX cycles.

10. The method of claim 9, wherein:
the additional beam update procedure is performed in advance of transmission of the wakeup signal within a DRX cycle.

11. The method of claim 9, wherein:
the additional beam update procedure comprises transmission of a periodic channel state information reference signal (CSI-RS), a periodic synchronization signal, or combinations thereof.

12. The method of claim 9, further comprising:
identifying a communication metric associated with communications with the UE, with other UEs, or combinations thereof; and
selecting a value for the integer number of DRX cycles based at least in part on the communication metric.

13. The method of claim 1, further comprising:
performing, based at least on receiving the response signal, a beam management procedure to identify a third set of transmit beams for a physical downlink control channel (PDCCH) signal, the PDCCH signal indicating a grant of resources used to transmit the data to the UE; and
transmitting the data to the UE using the indicated resources.

14. The method of claim 13, further comprising:
receiving, based at least in part on the PDCCH signal, an additional response signal indicating at least one transmit beam from the third set of transmit beams; and
selecting, based at least in part on the indication, the at least one transmit beam to transmit the data to the UE.

15. The method of claim 13, wherein:
the third set of transmit beams comprises a subset of the first or second sets of transmit beams.

16. The method of claim 13, wherein:
the third set of transmit beams comprises a beam width narrower than a beam width of the first or second sets of transmit beams.

17. The method of claim 1, wherein:
the transmit beams in the first and second sets of transmit beams comprise pseudo-omni transmit beams.

18. The method of claim 1, wherein:
the wakeup signal comprises a narrowband tone, or a UE-specific reference signal, or a physical downlink control channel (PDCCH) including a bit that indicates that the UE is to wake up from a sleep state, or a combination thereof.

19. The method of claim 1, further comprising:
configuring the wakeup signal to include a bit that is transmitted responsive to determining that there is data available to be transmitted to the UE; and
configuring the wakeup signal to refrain from transmitting the bit responsive to determining that there is no data available to be transmitted to the UE.

20. A method for wireless communication, comprising:
receiving, from a base station and while operating in a discontinuous reception (DRX) mode, a wakeup signal indicating whether data is available to be transmitted to the UE, the wakeup signal transmitted using a first set of transmit beams in accordance with a beam sweeping configuration;
determining, based at least in part on the wakeup signal, that there is data available to be transmitted to the UE;
transmitting, based at least in part on the determining, a response signal; and
performing, based at least in part on the response signal, a beam update procedure to identify a second set of transmit beams for future transmissions of the wakeup signal to the UE.

21. The method of claim 20, wherein:
the response signal comprises a beam status report.

22. The method of claim 21, wherein:
the beam status report is transmitted to the base station in response to every transmission of the wakeup signal.

23. The method of claim 21, wherein:
the beam status report is transmitted to the base station in response to the at least one transmit beam in the first set of transmit beams being below the performance threshold.

24. The method of claim 20, further comprising:
receiving, a trigger message from the base station, wherein the beam update procedure is based at least in part on the trigger message.

25. The method of claim 20, further comprising:
performing, based at least on receiving the response signal, a beam management procedure to identify a third set of transmit beams for a physical downlink control channel (PDCCH) signal, the PDCCH signal indicating a grant of resources used to transmit the data to the UE; and
receiving the data from the base station using the indicated resources.

26. The method of claim 25, further comprising:
transmitting, based at least in part on the PDCCH signal, an additional response signal indicating at least one transmit beam from the third set of transmit beams, wherein the data is received from the base station based at least in part on the at least one transmit beam.

27. The method of claim 20, wherein:
the transmit beams in the first and second sets of transmit beams comprise pseudo-omni transmit beams.

28. The method of claim 20, wherein:
the wakeup signal comprises a narrowband tone, or a UE-specific reference signal, or a physical downlink control channel (PDCCH) including a bit that indicates that the UE is to wake up from a sleep state, or a combination thereof.

29. An apparatus for wireless communication, comprising:
a processor;
memory in electronic communication with the processor; and
instructions stored in the memory and operable, when executed by the processor, to cause the apparatus to:
transmit, to a user equipment (UE) operating in a discontinuous reception (DRX) mode, a wakeup signal indicating whether data is available to be transmitted to the UE, the wakeup signal transmitted using a first set of transmit beams in accordance with a beam sweeping configuration;
receive, from the UE and based at least in part on the wakeup signal, a response signal; and
perform, based at least in part on the response signal, a beam update procedure to identify a second set of transmit beams for future transmissions of the wakeup signal to the UE.

30. An apparatus for wireless communication, comprising:
- a processor;
- memory in electronic communication with the processor; and
- instructions stored in the memory and operable, when executed by the processor, to cause the apparatus to:
- receive, from a base station and while operating in a discontinuous reception (DRX) mode, a wakeup signal indicating whether data is available to be transmitted to the UE, the wakeup signal transmitted using a first set of transmit beams in accordance with a beam sweeping configuration;
- determine, based at least in part on the wakeup signal, that there is data available to be transmitted to the UE;
- transmit, based at least in part on the determining, a response signal; and
- perform, based at least in part on the response signal, a beam update procedure to identify a second set of transmit beams for future transmissions of the wakeup signal to the UE.

* * * * *